US008670884B2

(12) United States Patent
Takenaka

(10) Patent No.: US 8,670,884 B2
(45) Date of Patent: Mar. 11, 2014

(54) MOBILE DEVICE

(75) Inventor: Toru Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 633 days.

(21) Appl. No.: 12/957,749

(22) Filed: Dec. 1, 2010

(65) Prior Publication Data

US 2011/0144845 A1  Jun. 16, 2011

(30) Foreign Application Priority Data

Dec. 11, 2009 (JP) ................................ 2009-282070

(51) Int. Cl.
| B60L 11/00 | (2006.01) |
| G06F 7/00 | (2006.01) |
| G06F 17/00 | (2006.01) |
| G06F 19/00 | (2011.01) |
| G06G 7/00 | (2006.01) |

(52) U.S. Cl.
USPC .................................. 701/22; 701/48; 701/70

(58) Field of Classification Search
None
See application file for complete search history.

(56) References Cited

U.S. PATENT DOCUMENTS

| 8,089,234 B2 * | 1/2012 | Takizawa et al. ............. 318/432 |
| 2005/0171659 A1 * | 8/2005 | Okazaki ......................... 701/22 |
| 2008/0254935 A1 * | 10/2008 | Kasuga et al. .................... 477/3 |
| 2009/0088294 A1 * | 4/2009 | West et al. ....................... 477/98 |
| 2009/0321163 A1 * | 12/2009 | Suzui ....................... 180/65.265 |
| 2010/0038960 A1 | 2/2010 | Takenaka et al. |
| 2010/0070123 A1 * | 3/2010 | Itoh et al. ......................... 701/22 |
| 2010/0096905 A1 | 4/2010 | Takenaka et al. |
| 2010/0121515 A1 * | 5/2010 | Izumi ............................. 701/22 |

FOREIGN PATENT DOCUMENTS

| JP | 04-201793 A | 7/1992 |
| JP | 6-284788 A | 10/1994 |
| JP | 3070015 B2 | 5/2000 |
| WO | 2008-132778 A1 | 11/2008 |
| WO | 2008-132779 A1 | 11/2008 |

\* cited by examiner

*Primary Examiner* — Khoi Tran
*Assistant Examiner* — Bao Long T Nguyen
(74) *Attorney, Agent, or Firm* — Carrier Blackman & Associates, P.C.; Joseph P. Carrier; Jeffrey R. Gedeon

(57) ABSTRACT

In the case where a temperature allowance of one translational mechanism of a plurality of the translational mechanisms (the electric motors 31R, 31L) larger than a temperature allowance of the other translational mechanisms, the operation mode of a plurality of the translational mechanisms are controlled so that the heat generation amount of the one translational mechanism becomes larger than the heat generation amount of the other translational mechanisms. By doing so, the difference between the temperature allowances of a plurality of the translational mechanisms is reduced.

5 Claims, 13 Drawing Sheets

MOBILE DEVICE

TECHNICAL FIELD

The present invention relates to a mobile device.

BACKGROUND ART

The present inventors have proposed a control technology for an inverted pendulum type vehicle as a mobile device (refer to Japanese Patent No. 3070015, Published PCT International Application WO/2008/132778, and Published PCT International Application WO/2008/132779).

SUMMARY OF THE INVENTION

Problems to be Solved by the Invention

However, if the variation in heat deterioration lifetime is increased because of the variation of accumulated load between a plurality of motors used in a vehicle and the like, lifetime of a part of the motors is shortened. Therefore, there is a fear that a performance of the vehicle is deteriorated due to a functional loss of a part of the motors.

Therefore, the present invention aims to provide a mobile device capable of extending the heat deterioration lifetime of a plurality of translational mechanism which actuates accompanied by heat generation.

Means for Solving the Problems

To fulfill the object, the present invention provides a mobile device equipped with an energy accumulation component, a plurality of translational mechanisms for translational movement of the mobile device which actuate by consuming energy accumulated in the energy accumulation component, a first temperature measurement component configured to measure or estimate temperature of each translational mechanism, and a control device configured to control operation of each translational mechanism, wherein the control device is configured to control operating mode of each translational mechanism, in accordance with a temperature allowance of each translational mechanism which is a difference between a temperature of each translational mechanism measured or estimated by the first temperature measurement component in the state being smaller than a first temperature threshold value and the first temperature threshold value, or a sum of the difference and a proportional values of a temporal change rate of the difference, so that a heat generation amount of one translational mechanism having large temperature allowance compared to other translational mechanisms becomes larger compared to the heat generation amounts of other translational mechanisms (first aspect of the invention).

According to the mobile device of the present invention, in the case where the temperature allowance of one translational mechanism among a plurality of the translational mechanisms is larger than the temperature allowance of other translational mechanisms, the operating mode of a plurality of the translational mechanisms are controlled so that the heat generation amount of the one translational mechanism becomes larger than the heat generation amount of the other translational mechanisms. The heat generation amount of the translational mechanism is set in accordance with the energy consumption amount of the translational mechanism.

By doing so, the difference between the temperature allowance between a plurality of the translational mechanisms is reduced, so that frequency of the temperatures of each translational mechanism elevating to a temperature high enough to promote shortening of the heat deterioration lifetime is decreased. As a result, it becomes possible to extend the heat deterioration lifetime of each of the translational mechanisms.

The translational mechanism may be a translational mechanism equipped with a mechanical braking mechanism for braking the operation thereof mechanically. An overall heat generation amount of the translational mechanism may be controlled, by adjusting a kinetic energy of the translational mechanism which is converted to a heat generation energy by a dynamic friction of the mechanical braking mechanism, from actuation of the mechanical braking mechanism.

The phrase that the control device and the constituent components thereof are "configured to" execute a given arithmetic processing means that a CPU (arithmetic processing device) reads out data and program from a memory, and executes the arithmetic processing according to the program on the basis of the read-out data. The phrase "configured to" is a concept including that the same is "programmed to" do something.

In the mobile device of the first aspect of the invention, the control device may be configured to control the operating mode of each translational mechanism so that a difference between a ratio of the heat generation amount of the one translational mechanism with respect to a total heat generation amount of a plurality of the translational mechanisms and a ratio of the heat generation amounts of the other translational mechanisms with respect to the total heat generation amount of a plurality of the translational mechanisms becomes larger, as a difference between the temperature allowance of the one translational mechanism and the temperature allowance of the other translational mechanisms becomes larger (a second aspect of the invention).

According to the mobile device with the above-mentioned configuration, the ratio of the heat generation amount of each translational mechanism with respect to the total heat generation amount of a plurality of the translational mechanisms is adjusted in accordance with the difference of the temperature allowance between each translational mechanism. By doing so, the difference in the temperature allowance between a plurality of the translational mechanisms is decreased, so that it becomes possible to reduce the frequency of the temperatures of each translational mechanism elevating to a temperature high enough to promote shortening of the heat deterioration lifetime.

In the mobile device of the second aspect of the invention, the mobile device may further comprise an energy remaining amount measurement component configured to measure or estimate an energy remaining amount of the energy accumulation component, and the control device may be configured to control the operating mode of each of a plurality of the translational mechanisms, respectively, so that the difference between the ratio of the heat generation amount of the one translational mechanism with respect to the total heat generation amount of a plurality of the translational mechanisms and the ratio of the heat generation amounts of the other translational mechanisms with respect to the total heat generation amount of a plurality of the translational mechanisms becomes smaller, as the energy remaining amount measured or estimated by the energy remaining amount measurement component becomes larger (a third aspect of the invention).

According to the mobile device of the above-mentioned configuration, the difference of the heat generation amount between a plurality of the translational mechanisms operating by consuming energy is reduced as the consumption allowance of the energy accumulated in the energy accumulation component becomes larger. By doing so, it becomes possible to avoid the situation where the energy consumption amount, and further the heat generation amount by the operation of a part of the translational mechanisms among a plurality of the translational mechanism becomes excessive compared to the energy consumption amount by the operation of the other translational mechanisms. As a result, it becomes possible to reduce the frequency of each temperatures of a plurality of the translational mechanisms elevating to a temperature high enough to promote shortening of the heat deterioration lifetime because the difference in the temperature allowance between a plurality of the translational mechanisms is decreased.

In the mobile device of the first aspect of the invention, the mobile device may further comprise a braking mechanism which actuates to brake a translational motion of the mobile device, and a second temperature measurement component configured to measure or estimate a temperature of the braking mechanism, and the control device may be configured to control the operating mode of at least one translational mechanism so that the heat generating amount of the at least one translational mechanism decreases, and as well as to actuate the braking mechanism, taking the existence of a temperature allowance of the braking mechanism which is a difference between a temperature of the braking mechanism measured or estimated by the second temperature measurement component in the state being smaller than a second temperature threshold value and the second temperature threshold value, or a sum of the difference and a proportional value of a temporal change rate of the difference, as a requirement (a fourth aspect of the invention).

According to the mobile device of the above-mentioned configuration, the change in the translational mode of the mobile device in accordance with a change in the operation mode of a plurality of the translational mechanisms that decreases the heat generation amount of at least one translational mechanism may be adjusted according to the operation of the braking mechanism having temperature allowance. That is, the translational mode of the mobile device may be controlled so that the decrease in the temperature allowance of at least one translational mechanism is substituted by the decrease in the temperature allowance of the braking mechanism. By doing so, the difference in the temperature allowance among a plurality of the translational mechanisms is reduced, so that it becomes possible to reduce the frequency of each temperature of a plurality of the translational mechanisms elevating to a temperature high enough to promote shortening of the heat deterioration lifetime. As a result, each heat deterioration lifetime of a plurality of the translational mechanisms may be extended.

In the mobile device of the first aspect of the invention, the control device may be equipped with a desired total heat generation amount determination component configured to determine a desired total heat generation amount by the operation of a plurality of the translational mechanisms, on the basis of the energy consumption amount of each translational mechanism, a heat generation ratio determination component configured to determine a heat generation ratio of each translational mechanism in accordance with the temperature allowance of each translational mechanism, and a desired heat generation amount determination component configured to determine a desired heat generation amount of each translational mechanism, respectively, by integrating the heat generation ratio and the desired total heat generation amount, wherein the control device may be configured to control the operation of each translational mechanism so that the actual heat generation amount coincides with the desired heat generation amount (a fifth aspect of the invention).

According to the mobile device of the above-mentioned configuration, the operation of each translational mechanism is controlled so that the heat generation amount of each translational mechanism coincides with the desired heat generation amount, which is a result of integrating the desired total heat generation amount of all translational mechanisms, and the heat generation ratio, according to the temperature allowance of each translational mechanism. More specifically, the heat generation ratio is determined to a higher value as the temperature allowance becomes larger, and the operation of the translational mechanism may be controlled so that the heat generation amount becomes larger. In contrast thereto, the heat generation ratio is determined to a lower value as the temperature allowance becomes smaller, and the operation of the translational mechanism may be controlled so that the heat generation amount becomes smaller.

By doing so, the difference of the temperature allowance among a plurality of the translational mechanisms is reduced, so that it becomes possible to reduce the frequency of each temperatures of a plurality of the translational mechanisms elevating to a temperature high enough to promote shortening of the heat deterioration lifetime. As a result, each heat deterioration lifetime of a plurality of the translational mechanisms may be extended.

In the mobile device of the first aspect of the invention, a plurality of the translational mechanisms may be configured from identical specification (a sixth aspect of the invention).

According to the mobile device of the above-mentioned configuration, the operating mode of each translational mechanism and the relationship of the heat generation amount are common, so that it becomes possible to easily adjust the heat generation amount of each translational mechanism, in accordance with a differentiation of the operation mode of each translational mechanism and the like.

In the mobile device of the first aspect of the invention, the mobile device may further comprise a traveling motion unit which actuates a translational force of the mobile device with respect to a floor surface, while in contact with the floor surface, wherein the mobile device may be configured so that the common traveling motion unit is driven by a plurality of the translational mechanisms (a seventh aspect of the invention).

According to the mobile device of the above-mentioned configuration, the difference of the temperature allowance among a plurality of the translational mechanisms is reduced, so that each heat deterioration lifetime of a plurality of the translational mechanism may be extended. Therefore, it becomes possible to reduce the frequency of disablement of the traveling motion unit from disablement of a part of a plurality of the translational mechanisms.

MODE FOR CARRYING OUT THE INVENTION (Basic Construction of the Vehicle)

First, referring to FIG. 1 to FIG. 5, the structure of an inverted pendulum type vehicle in the present embodiment will be described.

Figure 1:
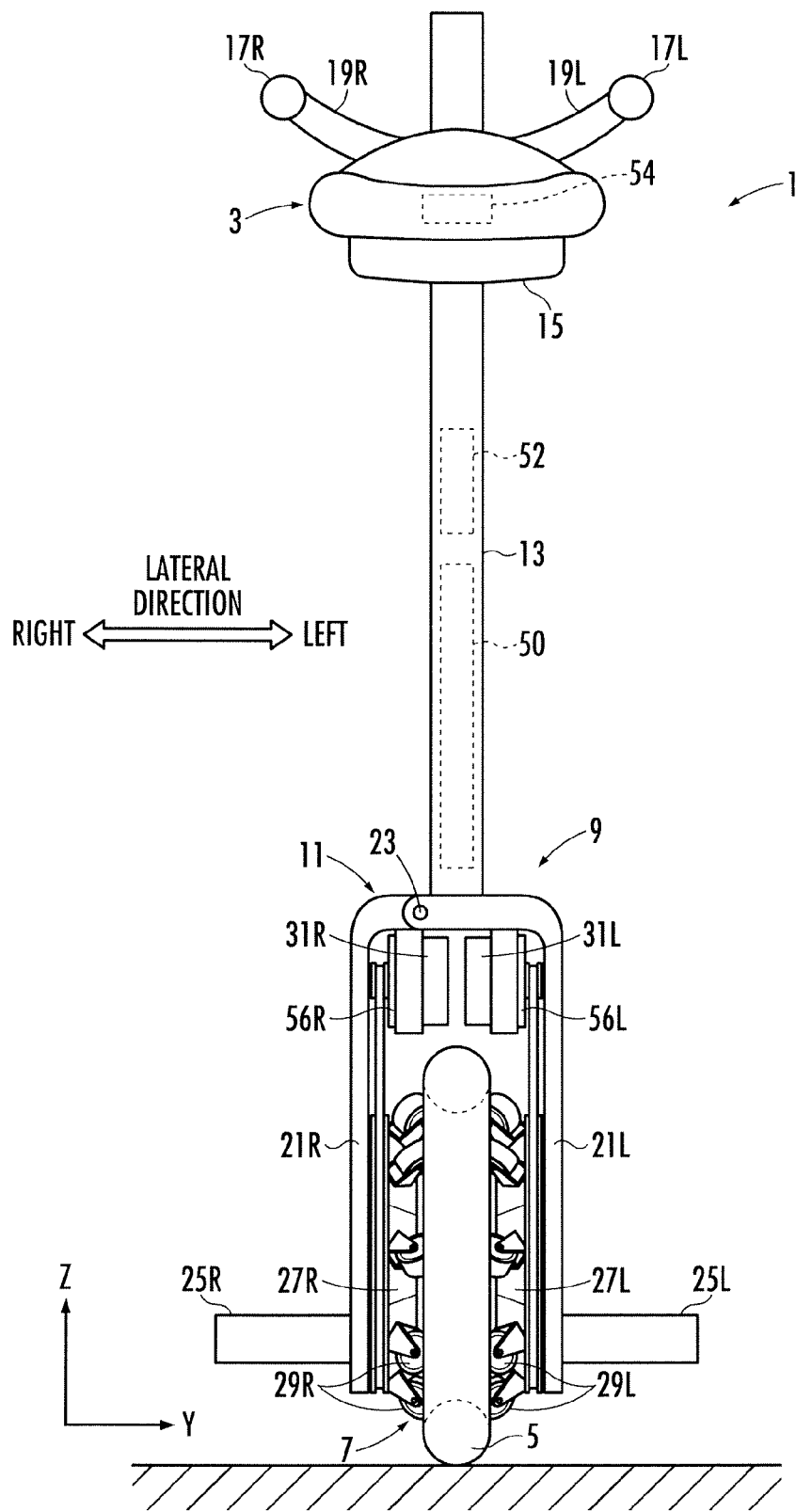
FIG. 1 is a front view of an inverted pendulum type vehicle as one embodiment of the present invention.
Figure 2:
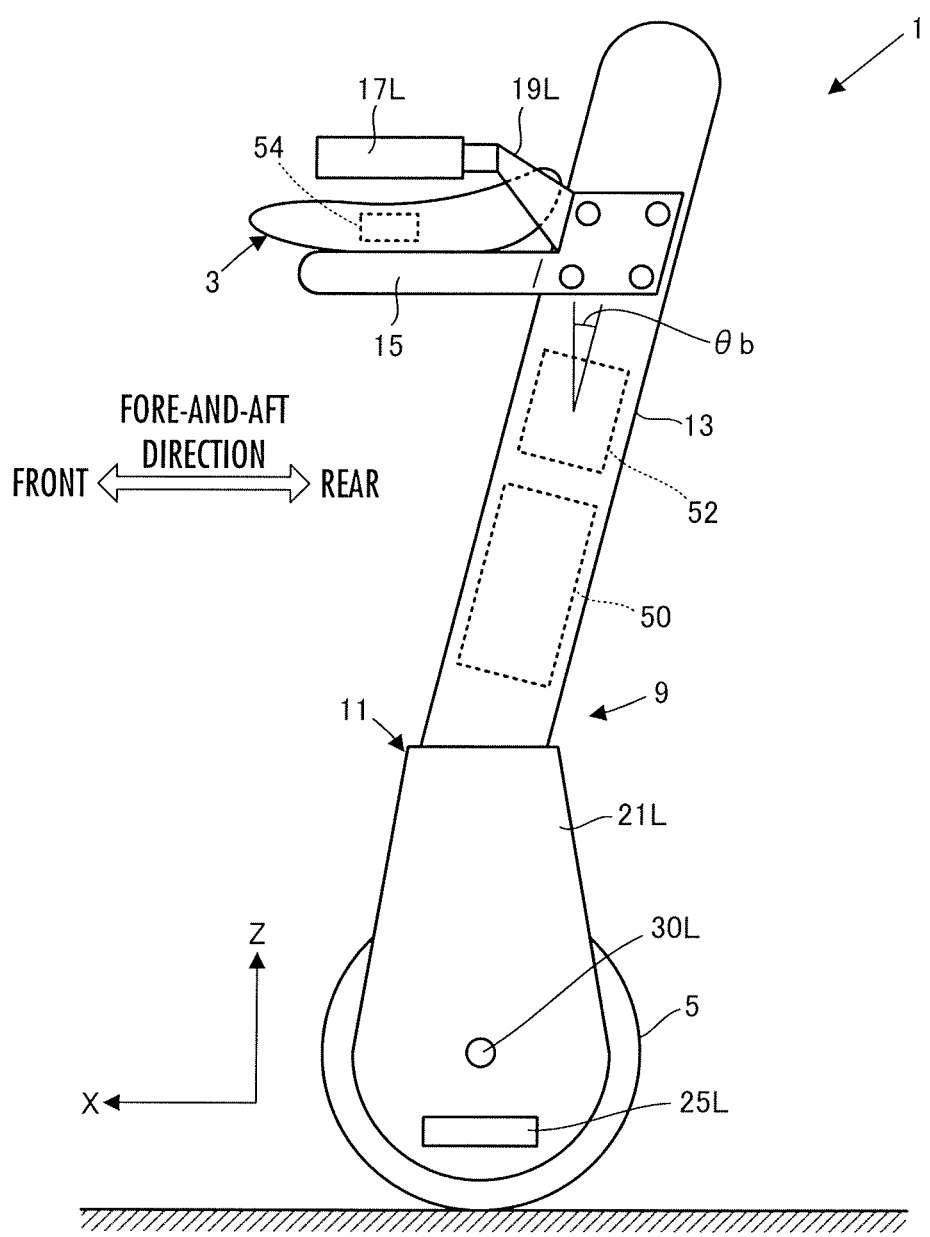
FIG. 2 is a side view of the inverted pendulum type vehicle.

As illustrated in FIG. 1 and FIG. 2, an inverted pendulum type vehicle 1 in the present embodiment includes a payload supporting part 3 for an occupant (driver) as a target object for transportation, a traveling motion unit 5 capable of traveling in all directions (two-dimensional all directions, including a fore-and-aft direction and a lateral direction) on a floor surface while being in contact with a floor surface, an actuator 7 which imparts, to the traveling motion unit 5, a motive power for driving the traveling motion unit 5, and a base body 9 on which the payload supporting part 3, the traveling motion unit 5, and the actuator 7 are mounted.

Here, in the description of the present embodiment, the "fore-and-aft direction" and the "lateral direction" mean the directions that coincide or substantially coincide with the fore-and-aft direction and the lateral direction, respectively, of the upper body of an occupant aboard the payload supporting part 3 in a normal posture. Incidentally, "the normal posture" is a posture envisaged in the design related to the payload supporting part 3, and it is a posture in which the trunk axis of the upper body of the occupant is oriented approximately in the vertical direction and the upper body is not twisted.

In this case, in FIG. 1, "the fore-and-aft direction" and "the lateral direction" are the direction perpendicular to the paper surface and the lateral direction of the paper surface, respectively. In FIG. 2, "the fore-and-aft direction" and "the lateral direction" are the lateral direction of the paper surface and the direction perpendicular to the paper surface, respectively. Further, in the description of the present embodiment, the suffixes "R" and "L" attached to reference numerals will be used to mean the correspondence to the right side and left side, respectively, of the vehicle 1.

The base body 9 is provided with a lower frame 11, to which the traveling motion unit 5 and the actuator 7 are installed, and a support frame 13 extendedly provided upward from the upper end of the lower frame 11.

A seat frame 15 extending toward the front from the support frame 13 is fixed to the top of the support frame 13. Further, the seat 3 on which an occupant sits is installed on the seat frame 15. In the present embodiment, the seat 3 serves as the payload supporting part for an occupant (payload supporting part for the target object for transportation). Hence, the inverted pendulum type vehicle 1 in the present embodiment (hereinafter referred to simply as the vehicle 1) travels on a floor surface with an occupant seated on the seat 3.

Further, grips 17R and 17L to be grasped as necessary by the occupant seated on the seat 3 are disposed on the right and left of the seat 3. These grips 17R and 17L are secured to the distal portions of brackets 19R and 19L, respectively, which are provided extendedly from the support frame 13 (or the seat frame 15).

The lower frame 11 is provided with a pair of cover members 21R and 21L disposed to face each other in a forked shape with a gap therebetween in the lateral direction. The upper end portions (the forked portions) of these cover members 21R and 21L are connected through a hinge shaft 23 having a longitudinal axial center, so that one of the cover members 21R and 21L is relatively swingable about the hinge shaft 23 with respect to the other. In this case, the cover members 21R and 21L are biased by springs, which are not shown, in the direction in which the bottom end portions (the distal ends of the forked portions) of the cover members 21R and 21L narrow.

Further, a step 25R on which the occupant seated on the seat 3 rests his/her right foot and a step 25L on which the occupant rests his/her left foot are provided on the outer surfaces of the cover members 21R and 21L such that the steps extend out rightward and leftward, respectively.

The traveling motion unit 5 and the actuator 7 are disposed between the cover members 21R and 21L of the lower frame 11. The structures of the traveling motion unit 5 and the actuator 7 will be described with reference to FIG. 3 to FIG. 5.

The traveling motion unit 5 and the actuator 7 illustrated in the present embodiment have the same structures as those disclosed in, for example, FIG. 1 of patent document 2 mentioned above. Hence, in the description of the present embodiment, the aspects of the structures of the traveling motion unit 5 and the actuator 7 which are described in the aforesaid patent document 2 will be only briefly described.

In the present embodiment, the traveling motion unit 5 is a wheel assembly made of a rubber elastic material formed into an annular shape and has a substantially circular cross-sectional shape. This traveling motion unit 5 (hereinafter referred to as the wheel assembly 5) elastically deforms to be capable of rotating about a center C1 of the circular cross-section (more specifically, the circumferential line which passes the center C1 of the circular cross-section and which is concentric with the axial center of the wheel assembly 5), as indicated by an arrow Y1 in FIG. 4 and FIG. 5.

The wheel assembly 5 is disposed between the cover members 21R and 21L with an axial center C2 thereof (an axial center C2 orthogonal to the diametrical direction of the whole wheel assembly 5) oriented in the lateral direction, and comes in contact with a floor surface at the bottom end portion of the outer circumferential surface of the wheel assembly 5.

The wheel assembly 5 is capable of performing a motion of rotating about the axial center C2 of the wheel assembly 5 as indicated by an arrow Y2 in FIG. 4 (a motion of circumrotating on a floor surface) and a motion of rotating about the center C1 of the cross-section of the wheel assembly 5 by being driven by the actuator 7 (to be discussed in detail later). As a result, the wheel assembly 5 is capable of traveling in all directions on a floor surface by the motions combining the aforesaid rotating motions.

The actuator 7 is provided with a rotating member 27R and free rollers 29R interposed between the wheel assembly 5 and the right cover member 21R, a rotating member 27L and free rollers 29L interposed between the wheel assembly 5 and the left cover member 21L, an electric motor 31R serving as an actuator disposed above the rotating member 27R and the free rollers 29R, and an electric motor 31L serving as an actuator disposed above the rotating member 27L and the free rollers 29L.

The housings of the electric motors 31R and 31L are installed to the cover members 21R and 21L, respectively. Although not shown, the electric sources (batteries or capacitors) of the electric motors 31R and 31L are mounted on an appropriate place of the base body 9, such as the support frame 13 or the like.

The rotating member 27R is rotatively supported by the cover member 21R through the intermediary of a support axis 33R having a lateral axial center. Similarly, the rotating member 27L is rotatively supported by the cover member 21L through the intermediary of a support axis 33L having a lateral axial center. In this case, the rotational axial center of the rotating member 27R (the axial center of the support axis 33R) and the rotational axial center of the rotating member 27L (the axial center of the support axis 33L) are concentric with each other.

Figure 3:
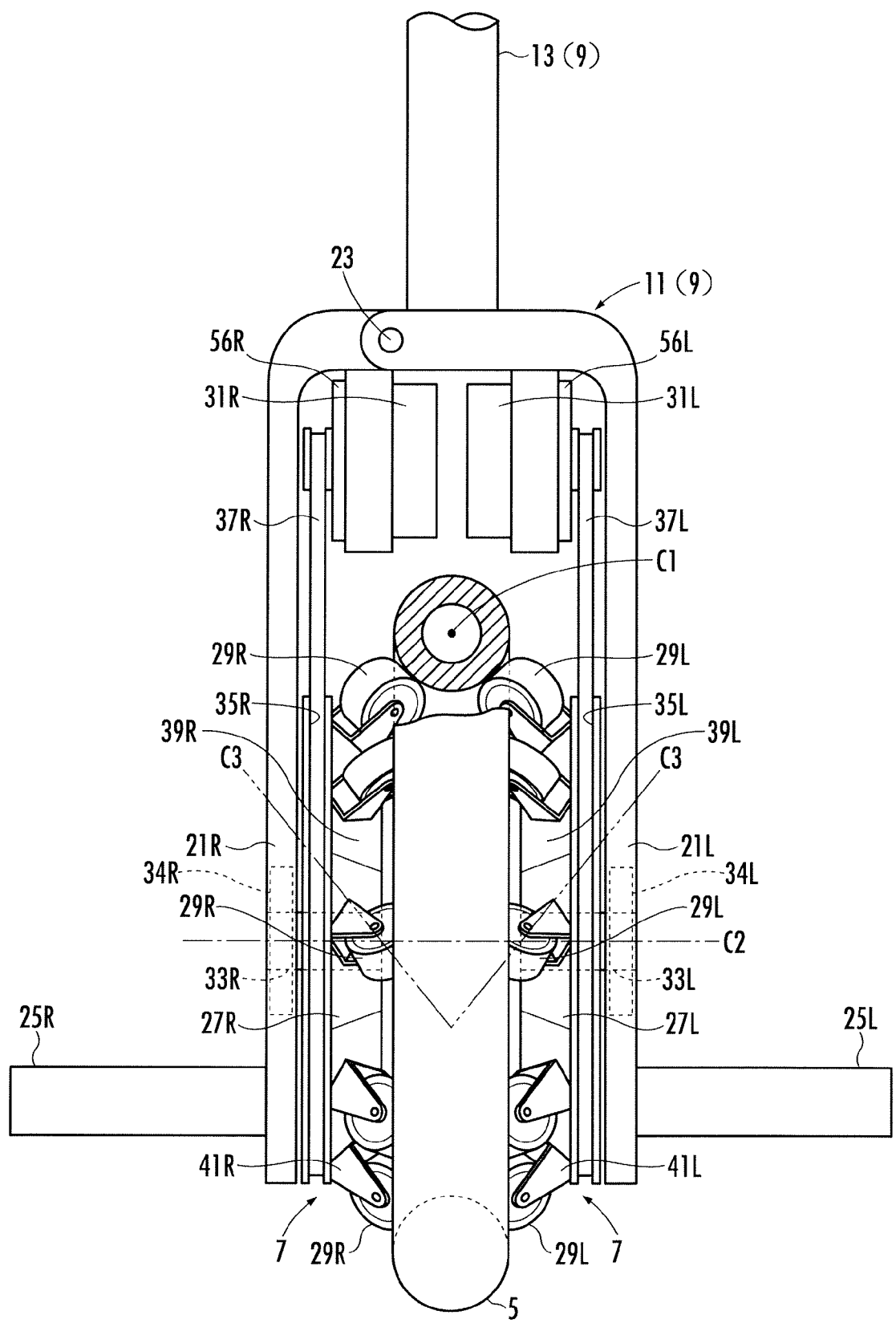
FIG. 3 is an enlarged view of a lower portion of the inverted pendulum type vehicle.

The rotating members 27R and 27L are connected to the output shafts of the electric motors 31R and 31L, respectively, through the intermediary of power transmission mechanisms, including functions as reducers, and rotatively driven by the motive power (torque) transmitted from the electric motors 31R and 31L, respectively. The power transmission mechanisms are, for example, pulley and belt system. More specifically, as illustrated in FIG. 3, the rotating member 27R is connected to the output shaft of the electric motor 31R through the intermediary of a pulley 35R and a belt 37R. Similarly, the rotating member 27L is connected to the output shaft of the electric motor 31L through the intermediary of a pulley 35L and a belt 37L.

Mechanical brakes 34R, 34L are fixed to support axes 33R, 33L that are rotational axes of the rotating members 27R, 27L, and configured to brake the rotation of the rotating members 27R, 27L by pushing a brake pad which is driven by a piston against the disk rotating about the axial center of the rotational axis.

The specification of each of the electric motor 31R and the mechanical brake 34R, and the specification of each of the electric motor 31L and the mechanical brake 34L constituting a left functional unit 30L are set to be the same.

The electric motors 31R, 31L and the mechanical brakes 34R, 34L may be arranged close to each other in a configuration enabling heat transfer, or may be configured as one block.

Incidentally, the power transmission mechanism may be constructed of, for example, a sprocket and a link chain, or may be constructed of a plurality of gears. As another alternative, for example, the electric motors 31R and 31L may be constructed such that the output shafts thereof are arranged to oppose the rotating members 27R and 27L so as to arrange the output shafts to be concentric with the rotating members 27R and 27L, and the output shafts of the electric motors 31R and 31L may be connected to the rotating members 27R and 27L, respectively, through the intermediary of reducers (e.g., planetary gear devices).

The rotating members 27R and 27L are formed in the same shapes as circular truncated cones, the diameters of which reduce toward the wheel assembly 5, and the outer peripheral surfaces thereof form tapered outer peripheral surfaces 39R and 39L.

A plurality of the free rollers 29R are arrayed about the tapered outer peripheral surface 39R of the rotating member 27R such that the free rollers 29R are arranged at regular intervals on the circumference concentric with the rotating member 27R. Further, these free rollers 29R are installed to the tapered outer peripheral surface 39R through the intermediary of the brackets 41R and rotatively supported by the brackets 41R.

Similarly, a plurality of free rollers 29L (of the same quantity as that of the free rollers 29R) are arrayed about the tapered outer peripheral surface 39L of the rotary member 27L such that the free rollers 29L are arrayed at regular intervals on the circumference concentric with the rotating member 27L. Further, these free rollers 29L are installed to the tapered outer peripheral surface 39L through the intermediary of the brackets 41L and rotatively supported by the brackets 41L.

The wheel assembly 5 is disposed concentrically with the rotating members 27R and 27L, and held between the free rollers 29R adjacent to the rotating member 27R and the free rollers 29L adjacent to the rotating member 27L.

Figure 5:
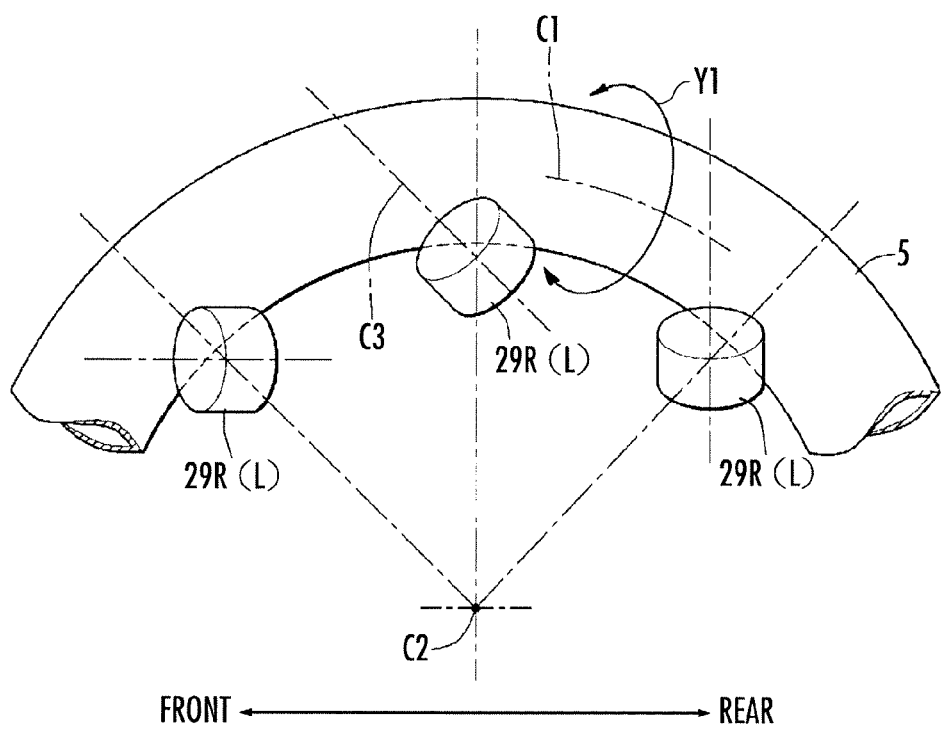
FIG. 5 is a diagram illustrating the placement relationship between the traveling motion unit (wheel assembly) and free rollers of the inverted pendulum type vehicle.

In this case, as illustrated in FIG. 1 and FIG. 5, the free rollers 29R and 29L are disposed in postures in which the axial centers C3 thereof are inclined against the axial center C2 of the wheel assembly 5 and also inclined against the diametrical direction of the wheel assembly 5 (the radial direction connecting the axial center C2 and the free rollers 29R and 29L when the wheel assembly 5 is observed in the direction of the axial center C2 thereof). Further, in the aforesaid postures, the outer peripheral surfaces of the free rollers 29R and 29L, respectively, are pressed into contact aslant with the inner peripheral surface of the wheel assembly 5.

More generally speaking, the right free rollers 29R are pressed into contact with the inner peripheral surface of the wheel assembly 5 in postures in which a frictional force component in the direction about the axial center C2 (a frictional force component in the tangential direction of the inner periphery of the wheel assembly 5) and a frictional force component in the direction about the center C1 of the cross-section of the wheel assembly 5 (a frictional force component in the tangential direction of the circular cross section) can be applied to the wheel assembly 5 at a surface in contact with the wheel assembly 5 when the rotating member 27R is rotatively driven about the axial center C2. The same applies to the left free rollers 29L.

In this case, as described above, the cover members 21R and 21L are biased by the springs, which are not shown, in the direction for narrowing the bottom end portions (the distal ends of the forked portions) of the cover members 21R and 21L. Thus, the urging force holds the wheel assembly 5 between the right free rollers 29R and the left free rollers 29L, and the free rollers 29R and 29L are maintained in the press contact with the wheel assembly 5 (more specifically, the press contact state that enables a frictional force to act between the free rollers 29R and 29L and the wheel assembly 5).

(Basic Operation of the Vehicle)

In the vehicle 1 having the structure described above, when the rotating members 27R and 27L are rotatively driven at the same velocity in the same direction by the electric motors 31R and 31L, respectively, the wheel assembly 5 will rotate about the axial center C2 in the same direction as those of the rotating members 27R and 27L. This causes the wheel assembly 5 to circumrotate on a floor surface in the fore-and-aft direction and the whole vehicle 1 will travel in the fore-and-aft direction. In this case, the wheel assembly 5 does not rotate about the center C1 of the cross-section thereof.

Further, if, for example, the rotating members 27R and 27L are rotatively driven in opposite directions from each other at velocities of the same magnitude, then the wheel assembly 5 will rotate about the center C1 of the cross section thereof. This causes the wheel assembly 5 to travel in the direction of the axial center C2 thereof (i.e., in the lateral direction), thus causing the whole vehicle 1 to travel in the lateral direction. In this case, the wheel assembly 5 does not rotate about the axial center C2 thereof.

Further, if the rotating members 27R and 27L are rotatively driven in the same direction or opposite directions at velocities that are different from each other (velocities including directions), then the wheel assembly 5 will rotate about the axial center C2 and also rotate about the center C1 of the cross-section thereof.

At this time, motions combining the aforesaid rotational motions (combined motions) cause the wheel assembly 5 to travel in directions inclined relative to the fore-and-aft direction and the lateral direction, thus causing the whole vehicle 1 to travel in the same direction as that of the wheel assembly 5. The traveling direction of the wheel assembly 5 in this case will change, depending upon the difference between the rotational velocities, including the rotational directions, of the rotating members 27R and 27L (the rotational velocity vectors, the polarities of which are defined according to rotational directions).

The traveling motions of the wheel assembly 5 effected as described above. Therefore, by controlling the rotational velocities (including the rotational directions) of the electric motors 31R and 31L, and consequently by controlling the rotational velocities of the rotating members 27R and 27L, it becomes possible to control the moving velocity and the traveling direction of the vehicle 1.

Incidentally, the seat (the payload supporting part) 3 and the base body 9 are tiltable about the lateral axial center C2, the axial center C2 of the wheel assembly 5 being the supporting point, and also tiltable together with the wheel assembly 5 about the longitudinal axis, the ground contact surface (the lower end surface) of the wheel assembly 5 being the supporting point.

(Construction of the Control Device of the Vehicle)

The construction for controlling the operation of the vehicle 1 according to the present embodiment will now be described. In the following description, assuming an XYZ coordinate system, in which the longitudinal horizontal axis is indicated by an X-axis, the lateral horizontal axis is indicated by a Y-axis, and the vertical direction is indicated by a Z-axis, as illustrated in FIG. 1 and FIG. 2, the fore-and-aft direction and the lateral direction may be referred to as the X-axis direction and the Y-axis direction, respectively.

First, the control of the operation of the vehicle 1 will be outlined. According to the present embodiment, basically, if the occupant seated on the seat 3 tilts his/her upper body (more specifically, if the upper body is tilted such that the position of the overall center-of-gravity point combining the occupant and the vehicle 1 (the position projected onto a horizontal plane) is moved), then the base body 9 is tilted together with the seat 3 toward the side to which the upper body has been tilted. At this time, the traveling motion of the wheel assembly 5 is controlled such that the vehicle 1 travels toward the side to which the base body 9 has tilted. For example, if the occupant tilts his/her upper body forward, causing the base body 9 to tilt forward together with the seat 3, then the traveling motion of the wheel assembly 5 is controlled to cause the vehicle 1 to travel forward.

In other words, according to the present embodiment, the operation in which the occupant moves his/her upper body, causing the seat 3 and the base body 9 to tilt provides one basic steering operation for the vehicle 1 (a motion request of the vehicle 1), and the traveling motion of the wheel assembly 5 is controlled through the actuator 7 according to the steering operation.

Here, in the vehicle 1 according to the present embodiment, the ground contact surface of the wheel assembly 5 as the ground contact surface of the whole vehicle 1 will be a single local region which is smaller than a region resulting from projecting all the vehicle 1 and the occupant thereon onto a floor surface, and a floor reaction force will act only on the single local region. For this reason, in order to prevent the base body 9 from falling due to tilting, the wheel assembly 5 must be moved such that the overall center-of-gravity point of the occupant and the vehicle 1 is positioned substantially right above the ground contact surface of the wheel assembly 5.

Therefore, according to the present embodiment, the posture of the base body 9 in a state wherein the overall center-of-gravity point of the occupant and the vehicle 1 is positioned substantially right above the central point of the wheel assembly 5 (the central point on the axial center C2) (more precisely, in a state wherein the center-of-gravity point is positioned substantially right above the ground contact surface of the wheel assembly 5) is defined as a desired posture, and basically, the traveling motion of the wheel assembly 5 is controlled such that the actual posture of the base body 9 is converged to the desired posture.

Further, in a state wherein no occupant is aboard the vehicle 1, the posture of the base body 9 in a state which the center-of-gravity point of the vehicle 1 alone is positioned substantially right above the central point of the wheel assembly 5 (the central point on the axial center C2) (more precisely, a state wherein the center-of-gravity point is positioned substantially right above the ground contact surface of the wheel assembly 5) is defined as a desired posture, and the actual posture of the base body 9 is converged to the desired posture. Thus, the traveling motion of the wheel assembly 5 is controlled such that the vehicle 1 supports itself without causing the base body 9 to fall from tilting.

Further, the traveling motion of the wheel assembly 5 is controlled so that, in either state of the state in which the occupant is aboard the vehicle 1 and in which the occupant is not aboard the vehicle 1, the moving velocity of the vehicle 1 increases as the deviation of the actual posture of the base body 9 from the desired posture increases, and the movement of the vehicle 1 stops in the case where the actual posture of the base body 9 coincides with the desired posture.

Supplementally, "the posture" means a spatial orientation. In the present embodiment, when the base body 9 tilts together with the seat 3, the postures of the base body 9 and the seat 3 change. Further, in the present embodiment, the base body 9 and the seat 3 integrally tilt, so that converging the posture of the base body 9 to the desired posture is equivalent to converging the posture of the seat 3 to a desired posture associated with the seat 3 (the posture of the seat 3 in a state wherein the posture of the base body 9 coincides with a desired posture of the base body 9).

According to the present embodiment, in order to control the operation of the vehicle 1 as described above, a control unit 50 constituted of an electronic circuit unit which mainly includes a microcomputer and a drive circuit unit for the electric motors 31R and 31L, a tilt sensor 52 for measuring a tilt angle $\theta b$ relative to the vertical direction (the gravitational direction) of a predetermined portion of the base body 9 and a changing velocity thereof ($=d\theta b/dt$), a load sensor 54 for detecting whether or not an occupant is aboard the vehicle 1, and rotary encoders 56R and 56L serving as angle sensors for detecting the rotational angles and the rotational angular velocities of the output shafts of the electric motors 31R and 31L, respectively, are mounted at appropriate places of the vehicle 1, as illustrated in FIG. 1 and FIG. 2.

In this case, the control unit 50 and the tilt sensor 52 are installed to the support frame 13 by, for example, being accommodated in the support frame 13 of the base body 9. Further, the load sensor 54 is incorporated in the seat 3. Further, the rotary encoders 56R and 56L are provided integrally with the electric motors 31R and 31L. The rotary encoders 56R and 56L may alternatively be attached to the rotating members 27R and 27L, respectively.

More specifically, the aforesaid tilt sensor 52 is constructed of an acceleration sensor and a rate sensor (angular velocity sensor), such as a gyro sensor, and outputs detection signals of these sensors to the control unit 50. Then, the control unit 50 carries out predetermined measurement arithmetic processing (this may be publicly known arithmetic processing) on the basis of the outputs of the acceleration sensor and the rate sensor of the tilt sensor 52 thereby to calculate the measured value of the tilt angle θb of the portion, to which the tilt sensor 52 is installed (the support frame 13 in the present embodiment), relative to the vertical direction and the measured value of the tilt angular velocity θbdot, which is a change velocity (differential value) thereof.

In this case, to be more specific, the tilt angle θb to be measured (hereinafter referred to as a base body tilt angle θb in some cases) is constituted of a component in the direction about the Y-axis (a pitch direction) θb_x and a component in the direction about the X-axis (a roll direction) θb_y. Similarly, the tilt angular velocity θbdot to be measured (hereinafter referred to a base body tilt angular velocity θbdot in some cases) is constituted of a component in the direction about the Y-axis (the pitch direction) θbdot_x (=dθb_x/dt) and a component in the direction about the X-axis (the roll direction) θbdot_y(=dθb_y/dt).

Supplementally, according to the present embodiment, the seat 3 tilts integrally with the support frame 13 of the base body 9, so that the base body tilt angle θb also has a meaning as the tilt angle of the payload supporting part 3.

In the description of the present embodiment, regarding variables, such as a motional state amount having components in directions of the X-axis and the Y-axis, such as the aforesaid base body tilt angle θb (or directions about axes), or variables, such as coefficients related to the motional state amount, the reference characters of the variables will be accompanied by a suffix "_x" or "_y" to distinguishably denote the components.

In this case, for the variables related to translational motions, such as a translational velocity, a component in the X-axis direction thereof will be accompanied by the suffix "_x" and a component in the Y-axis direction thereof will be accompanied by the suffix "_y."

Meanwhile, regarding the variables related to rotational motions, such as angles, rotational velocities (angular velocities), and angular acceleration, for the purpose of convenience, a component in the direction about the Y-axis will be accompanied by the suffix "_x" and a component in the direction about the X-axis will be accompanied by the suffix "_y" in order to match the variables related to translational motions with suffixes.

Further, to denote a variable in the form of a pair of a component in the X-axis direction (or a component in the direction about the Y-axis) and a component in the Y-axis direction (or a component in the direction about the X-axis), the suffix "_xy" is added to the reference character of the variable. For example, to express the aforesaid base body tilt angle θb in the form of the pair of a component in the direction about the Y-axis θb_x and a component in the direction about the X-axis θb_y, the pair will be denoted by "the base body tilt angle θb_xy."

The load sensor 54 is incorporated in the seat 3 so as to be subjected to a load from the weight of an occupant when the occupant sits on the seat 3, and outputs a detection signal based on the load to the control unit 50. Then, the control unit 50 determines whether or not the occupant is aboard the vehicle 1 on the basis of the measured value of the load indicated by the output of the load sensor 54.

In place of the load sensor 54, a switch type sensor which, for example, turns on when an occupant sits on the seat 3 may be used.

The rotary encoder 56R generates a pulse signal each time the output shaft of the electric motor 31R rotates for a predetermined angle, and outputs the pulse signal to the control unit 50. Then, based on the pulse signal, the control unit 50 measures the rotational angle of the output shaft of the electric motor 53R and further measures the temporal change rate (differential value) of the measured value of the rotational angle as the rotational angular velocity of the electric motor 53R. The same applies to the rotary encoder 56L for the electric motor 31L.

The control unit 50 carries out predetermined arithmetic processing by using the aforesaid measured values thereby to determine velocity commands, which are the desired values of the rotational angular velocities of the electric motors 31R and 31L, respectively, and carries out feedback control on the rotational angular velocity of each of the electric motors 31R and 31L according to the determined velocity commands Incidentally, the relationship between the rotational angular velocity of the output shaft of the electric motor 31R and the rotational angular velocity of the rotating member 27R will be a proportional relationship based on the speed reduction ratio of a fixed value between the output shaft and the rotating member 27R. Hence, for the sake of convenience, in the description of the present embodiment, the rotational angular velocity of the electric motor 31R will mean the rotational angular velocity of the rotating member 27R. Similarly, the rotational angular velocity of the electric motor 31L will mean the rotational angular velocity of the rotating member 27L.

(Outline of the Control Method of the Vehicle)

The following will describe in more detail the control processing carried out by the control unit 50.

Figure 6:
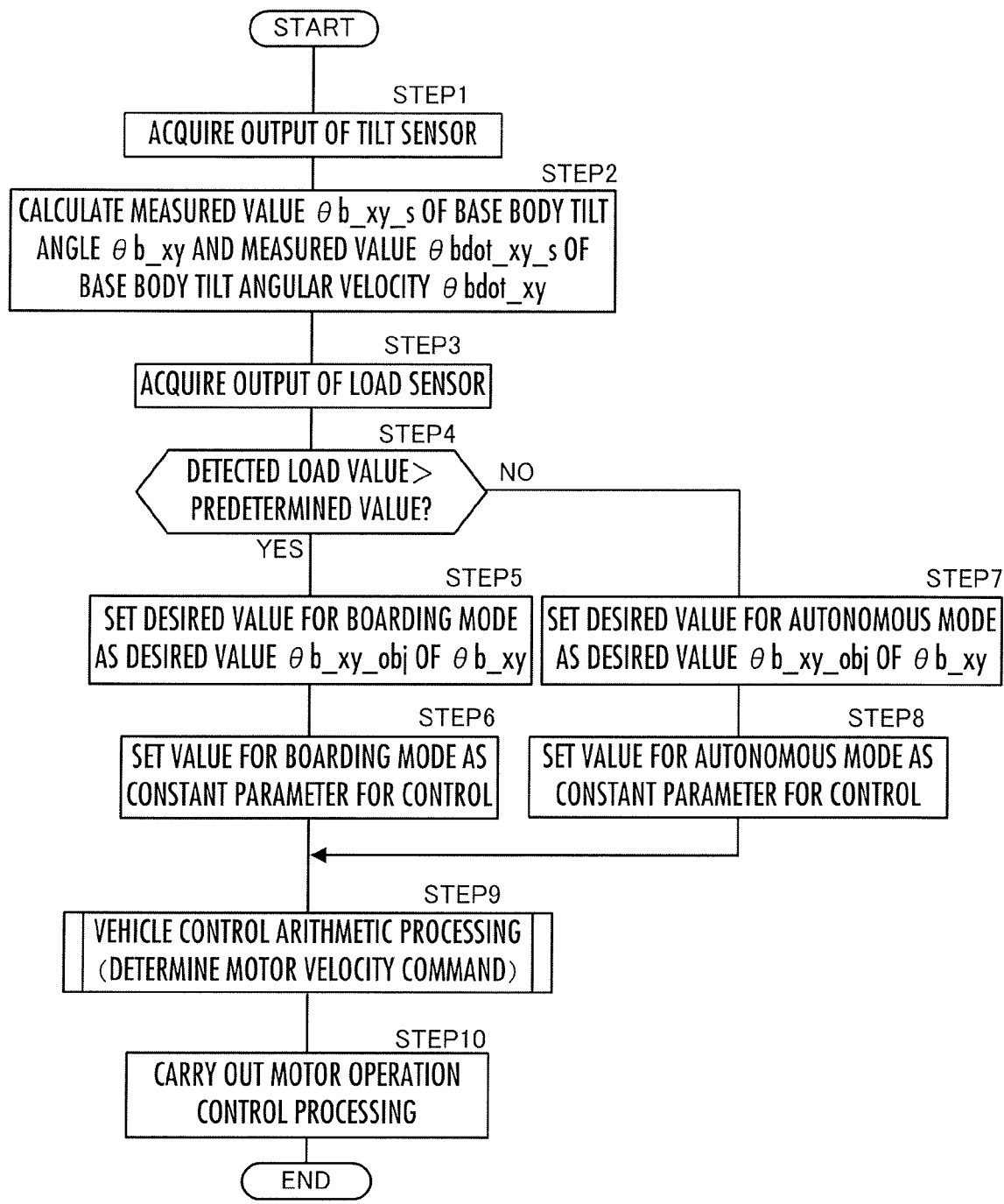
FIG. 6 is a flowchart illustrating the processing by a control unit of the inverted pendulum type vehicle.

The control unit 50 executes the processing (main routine processing) illustrated by the flowchart of FIG. 6 at a predetermined control processing cycle.

First, in STEP1, the control unit 50 acquires an output of a tilt sensor 52.

Subsequently, the control unit 50 proceeds to STEP2 to calculate a measured value θb_xy_s of a base body tilt angle θb and a measured value θbdot_xy_s of a base body tilt angular velocity θbdot on the basis of the acquired output of the tilt sensor 52.

In the following description, to denote the observed value (the measured value or an estimated value) of an actual value of a variable (a state amount), such as the measured value θb_xy_s, by a reference character, the reference character of the variable will have a suffix "_s".

Next, after acquiring an output of a load sensor 54 in STEP3, the control unit 50 carries out the determination processing in STEP4. In the determination processing, the control unit 50 determines whether or not the vehicle 1 has an occupant aboard (whether or not an occupant is sitting on the seat 3) by determining whether or not the load measured value indicated by the acquired output of the load sensor 54 is larger than a predetermined value which has been set beforehand.

Then, if the determination result in STEP4 is affirmative, then the control unit 50 carries out the processing for setting a desired value θb_xy_obj of the base body tilt angle θb and the processing for setting the values of constant parameters (e.g., the basic values of various gains) for controlling the operation of the vehicle 1 in STEP5 and STEP6, respectively.

In STEP5, the control unit 50 sets a predetermined desired value for a boarding mode as the desired value θb_xy_obj of the base body tilt angle θb.

Here, the term "boarding mode" means the operation mode of the vehicle 1 in the case where the occupant is aboard the vehicle 1. The desired value θb_xy_obj for the boarding mode is preset such that desired value θb_xy_obj coincides or substantially coincides with the measured value θb_xy_s of the base body tilt angle θb measured on the basis of an output of the tilt sensor 52 in a posture of the base body 9 in which the overall center-of-gravity point of the vehicle 1 and the occupant seated on the seat 3 (hereinafter referred to as the vehicle-occupant overall center-of-gravity point) is positioned substantially right above a ground contact surface of the wheel assembly 5.

Further, in STEP6, the control unit 50 sets predetermined values for the boarding mode as the values of constant parameters for controlling the operation of the vehicle 1. The constant parameters include, for example, hx, hy, Ki_a_x, Ki_b_x, Ki_a_y, and Ki_b_y (i=1, 2, 3), which will be discussed later.

Meanwhile, if the determination result in STEP4 is negative, then the control unit 50 carries out the processing for setting a desired value θb_xy_obj of a base body tilt angle θb_xy and the processing for setting the values of constant parameters for controlling the operation of the vehicle 1 in STEP7 and STEP8, respectively.

In STEP7, the control unit 50 sets a predetermined desired value for an autonomous mode as the desired value θb_xy_obj of the base body tilt angle θb.

Here, the term "autonomous mode" means an operation mode of the vehicle 1 in the case where the occupant is not aboard the vehicle 1. The desired value θb_xy_obj for the autonomous mode is preset such that desired value θb_xy_obj coincides or substantially coincides with the measured value θb_xy_s of the base body tilt angle θb measured on the basis of an output of the tilt sensor 52 in a posture of the base body 9 in which the center-of-gravity point of the vehicle 1 alone (hereinafter referred to as the vehicle-alone center-of-gravity point) is positioned substantially right above the ground contact surface of the wheel assembly 5. The desired value θb_xy_obj for the autonomous mode is generally different from the desired value θb_xy_obj for the boarding mode.

Further, in STEP8, the control unit 50 sets predetermined values for the autonomous mode as the values of constant parameters for controlling the operation of the vehicle 1. The values of the constant parameters for the autonomous mode are different from the values of the constant parameters for the boarding mode.

The aforesaid values of the constant parameters are set to be different between the boarding mode and the autonomous mode, because the response characteristics of the operations of the vehicle 1 relative to control inputs are different from each other due to the differences in the height of the aforesaid center-of-gravity point, the overall mass, and the like between the respective modes.

By the processing in STEP4 to STEP8 described above, the desired value θb_xy_obj of the base body tilt angle θb_xy and the values of the constant parameters are set for each of the operational modes, namely, the boarding mode and the autonomous mode.

Incidentally, the processing in STEP5 and STEP6 or the processing in STEP7 and STEP8 is not essential to carry out for each control processing cycle. Alternatively, the processing may be carried out only when the determination result in STEP4 changes.

Supplementally, in both the boarding mode and the autonomous mode, the desired value of a component θbdot_x in the direction about a Y-axis of the base body tilt angular velocity θbdot and the desired value of a component θbdot_y in the direction about an X-axis thereof are both zero. For this reason, it is unnecessary to carry out the processing for setting a desired value of the base body tilt angular velocity θbdot_xy.

After carrying out the processing in STEP5 and STEP6 or the processing in STEP7 and STEP8 as described above, the control unit 50 carries out vehicle control arithmetic processing in STEP9 thereby to determine the speed commands for electric motors 31R and 31L, respectively. The vehicle control arithmetic processing will be discussed later in detail.

Subsequently, the control unit 50 proceeds to STEP10 to carry out the processing for controlling the operations of the electric motors 31R and 31L according to the speed commands determined in STEP9. In this operation control processing, based on the difference between the speed command for the electric motor 31R determined in STEP9 and the measured value of the rotational speed of the electric motor 31R measured on the basis of an output of a rotary encoder 56R, the control unit 50 determines a desired value (desired torque) of an output torque of the electric motor 31R such that the difference is converged to zero. Then, the control unit 50 controls the current supplied to the electric motor 31R such that the electric motor 31R outputs an output torque of the desired torque. The same applies to the operation control of the left electric motor 31L.

The above has described the general control processing carried out by the control unit 50.

(Details of the Control Method of the Vehicle)

The vehicle control arithmetic processing in STEP9 mentioned above will now be described in detail.

In the following description, the vehicle-occupant overall center-of-gravity point in the boarding mode and the vehicle-alone center-of-gravity point in the autonomous mode will be generically referred to as the vehicle system center-of-gravity point. The vehicle system center-of-gravity point will mean the vehicle-occupant overall center-of-gravity point when the operational mode of the vehicle 1 is the boarding mode and will mean the vehicle-alone center-of-gravity point when the operational mode of the vehicle 1 is the autonomous mode.

Further, in the following description, regarding the values (updated values) determined at each control processing cycle by the control unit 50, a value determined at a current (latest) control processing cycle may be referred to as a current value, and a value determined at an immediately preceding control processing cycle may be referred to as a previous value. Further, a value will mean a current value unless otherwise specified as a current value or a previous value.

Further, regarding the velocity and acceleration in the X-axis direction, a forward-facing direction will be defined as a positive direction, and regarding the velocity and acceleration in the Y-axis direction, a left-facing direction will be defined as the positive direction.

Figure 7:
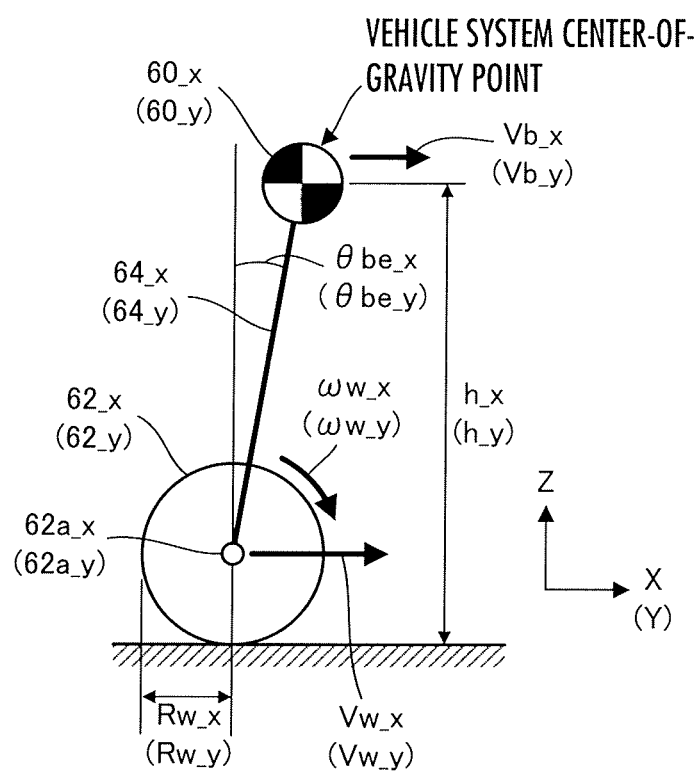
FIG. 7 is a diagram illustrating an inverted pendulum model expressing the dynamic behaviors of the inverted pendulum type vehicle.

In the present embodiment, the vehicle control arithmetic processing in STEP9 is carried out, assuming that the dynamic behaviors of the vehicle system center-of-gravity point (more specifically, the behaviors observed by projecting the behaviors from the Y-axis direction onto a plane (XZ plane) which is orthogonal thereto, and the behaviors observed by projecting the behaviors from the X-axis direction onto a plane (YZ plane) which is orthogonal thereto) are approximately expressed by the behaviors of an inverted pendulum model (dynamic behaviors of the inverted pendulum), as shown in FIG. 7.

In FIG. 7, unparenthesized reference numerals denote the reference numerals associated with the inverted pendulum model observed from the Y-axis direction, while the parenthesized reference numerals denote the reference numerals associated with the inverted pendulum model observed from the X-axis direction.

In this case, the inverted pendulum model expressing a behavior observed from the Y-axis direction is provided with a mass point 60_x positioned at the vehicle system center-of-gravity point and a imaginary wheel 62_x, which has a rotational axis 62a_x parallel to the Y-axis direction and which freely circumrotate on a floor surface (hereinafter referred to as the imaginary wheel 62_x). Further, the mass point 60_x is supported by a rotational shaft 62a_x of the imaginary wheel 62_x through the intermediary of a linear rod 64_x such that the mass point 60_x is swingable about the rotational shaft 62a_x, using the rotational shaft 62a_x as the supporting point.

In this inverted pendulum model, a motion of the mass point 60_x corresponds to a motion of the vehicle system center-of-gravity point observed from the Y-axis direction. Further, it is assumed that the tilt angle θbe_x of the rod 64_x relative to a vertical direction coincides with a difference θbe_x_s between a base body tilt angle measured value θb_x_s in the direction about the Y-axis and a base body tilt angle desired value θb_x_obj (=θb_x_s−θb_x_obj). It is also assumed that a changing velocity of the tilt angle θbe_x of the rod 64_x (=dθbe_x/dt) coincides with a base body tilt angular velocity measured value θbdot_x_s in the direction about the Y-axis. Further, it is assumed that a moving velocity Vw_x of the imaginary wheel 62_x (the translational moving velocity in the X-axis direction) coincides with the moving velocity of the wheel assembly 5 of the vehicle 1 in the X-axis direction.

Similarly, the inverted pendulum model expressing a behavior observed from the X-axis direction (refer to the parenthesized reference numerals in FIG. 7) is provided with a mass point 60_y positioned at the vehicle system center-of-gravity point and a imaginary wheel 62_y, which has a rotational axis 62a_y parallel to the X-axis direction and which freely circumrotate on a floor surface (hereinafter referred to as the imaginary wheel 62_y). Further, the mass point 60_y is supported by a rotational shaft 62a_y of the imaginary wheel 62_y through the intermediary of a linear rod 64_y such that the mass point 60_y is swingable about the rotational shaft 62a_y, using the rotational shaft 62a_y as the supporting point.

In this inverted pendulum model, a motion of the mass point 60_y corresponds to a motion of the vehicle system center-of-gravity point observed from the X-axis direction. Further, it is assumed that the tilt angle θbe_y of the rod 64_y relative to the vertical direction coincides with a difference θbe_y_s between a base body tilt angle measured value θb_y_s in the direction about the X-axis and a base body tilt angle desired value θb_y_obj (=θb_y_s−θb_y_obj). It is also assumed that a changing velocity of the tilt angle θbe_y of the rod 64_y (=dθbe_y/dt) coincides with a base body tilt angular velocity measured value θbdot_y_s in the direction about the X-axis. Further, it is assumed that a moving velocity Vw_y of the imaginary wheel 62_y (the translational moving velocity in the Y-axis direction) coincides with the moving velocity of the wheel assembly 5 of the vehicle 1 in the Y-axis direction.

It is assumed that the imaginary wheels 62_x and 62_y have radii Rw_x and Rw_y of predetermined values, respectively.

It is assumed that relationships represented by expressions 01a and 01b given below hold between rotational angular velocities ωw_x and ωw_y of the imaginary wheels 62_x and 62_y, respectively, and rotational angular velocities ω_R and ω_L of the electric motors 31R and 31L, respectively (more accurately, the rotational angular velocities ω_R and ω_L of rotational members 27R and 27L, respectively).

$$\omega w\_x = (\omega\_R + \omega\_L)/2 \qquad \text{Expression 01a}$$

$$\omega w\_y = C \cdot (\omega\_R - \omega\_L)/2 \qquad \text{Expression 01b}$$

Where "C" in expression 01b denotes a coefficient of a predetermined value that depends on a mechanical relationship or slippage between free rollers 29R and 29L and the wheel assembly 5. The positive directions of ωw_x, ω_R and ω_L are the rotational directions in which the imaginary wheel 62_x rotates in the case where the imaginary wheel 62_x circumrotates forward. The positive direction of ωw_y is the rotational direction in which the imaginary wheel 62_y rotates in the case where the imaginary wheel 62_y circumrotates leftwards.

Here, the dynamics of the inverted pendulum model shown in FIG. 7 is represented by expressions 03x and 03y given below. Expression 03x is an expression that represents the dynamics of the inverted pendulum model observed from the Y-axis direction, while expression 03y is an expression that represents the dynamics of the inverted pendulum model observed from the X-axis direction.

$$d^2\theta be\_x/dt^2 = \alpha\_x \cdot \theta be\_x + \beta\_x \cdot \omega dot\_x \qquad \text{Expression 03x}$$

$$d^2\theta be\_y/dt^2 = \alpha\_y \cdot \theta be\_y + \beta\_y \cdot \omega dot\_y \qquad \text{Expression 03y}$$

Where ωwdot_x in expression 03x denotes the rotational angular acceleration (first-order differential value of the rotational angular velocity ωw_x) of the imaginary wheel 62_x, α_x denotes a coefficient which depends on a mass or a height h_x of the mass point 60_x, and β_x denotes a coefficient which depends on an inertia (inertial moment) or the radius Rw_x of the imaginary wheel 62_x. The same applies to ωwdot_y, α_y, and β_y in expression 03y.

As may be understood from these expressions 03x and 03y, the motions of the mass points 60_x and 60_y of the inverted pendulum model (i.e., the motions of the vehicle system center-of-gravity point) are specified, depending on the rotational angular acceleration ωwdot_x of the imaginary wheel 62_x and the rotational angular acceleration ωwdot_y of the imaginary wheel 62_y, respectively.

In the present embodiment, therefore, the rotational angular acceleration ωwdot_x of the imaginary wheel 62_x is used as the manipulated variable (control input) for controlling the motion of the vehicle system center-of-gravity point observed from the Y-axis direction, while the rotational angular acceleration ωwdot_y of the imaginary wheel 62_y is used as the manipulated variable (control input) for controlling the motion of the vehicle system center-of-gravity point observed from the X-axis direction.

To briefly describe the vehicle control arithmetic processing in STEP9, the control unit 50 determines imaginary wheel rotational angular acceleration commands ωwdot_x_cmd and ωwdot_y_cmd, which are the command values (desired values) of the rotational angular accelerations ωwdot_x and ωwdot_y as the manipulated variables such that the motion of the mass point 60_x observed in the X-axis direction and the motion of the mass point 60_y observed in the Y-axis direction become the motions corresponding to desired motions of the vehicle system center-of-gravity point. Further, the control unit 50 determines the values obtained by integrating the imaginary wheel rotational angular acceleration commands ωwdot_x_cmd and ωwdot_y_cmd, respectively, as the imaginary wheel rotational angular velocity commands ωw_x_cmd and ωw_y_cmd, which are the command values (desired values) of the rotational angular velocities ωw_x and ωw_y of the imaginary wheels 62_x and 62_y, respectively.

Further, the control unit 50 defines the moving velocity of the imaginary wheel 62_x corresponding to the imaginary wheel rotational angular velocity command ωw_x_cmd (=Rw_x·ωw_x_cmd) and the moving velocity of the imaginary wheel 62_y corresponding to the imaginary wheel rotational angular velocity command ωw_y_cmd (=Rw_y·ωw_y_cmd) as the desired moving velocity of the wheel assembly 5 of the vehicle 1 in the X-axis direction and the desired moving velocity thereof in the Y-axis direction, respectively, and the control unit 50 determines velocity commands ω_R_cmd and ω_L_cmd of the electric motors 31R and 31L, respectively, so as to achieve the desired moving velocities.

In the present embodiment, the imaginary wheel rotational angular acceleration commands ωwdot_x_cmd and ωwdot_y_cmd as the manipulated variables (control inputs) are determined by adding up three manipulated variable components, as indicated by expressions 07x and 07y, which will be discussed later.

Supplementally, of the imaginary wheel rotational angular acceleration commands ωwdot_x_cmd and ωwdot_y_cmd as the manipulated variable (control input) in the present embodiment, ωwdot_x_cmd is a rotational angular acceleration of the imaginary wheel 62_x moving in the X-axis direction, so that it functions as the manipulated variable which stipulates the driving force to be imparted to the wheel assembly 5 so as to make the wheel assembly 5 move in the X-axis direction. Further, because ωwdot_y_cmd is a rotational angular acceleration of the imaginary wheel 62_y moving in the Y-axis direction, so that it functions as the manipulated variable which stipulates the driving force to be imparted to the wheel assembly 5 so as to make the wheel assembly 5 move in the Y-axis direction.

Figure 8:
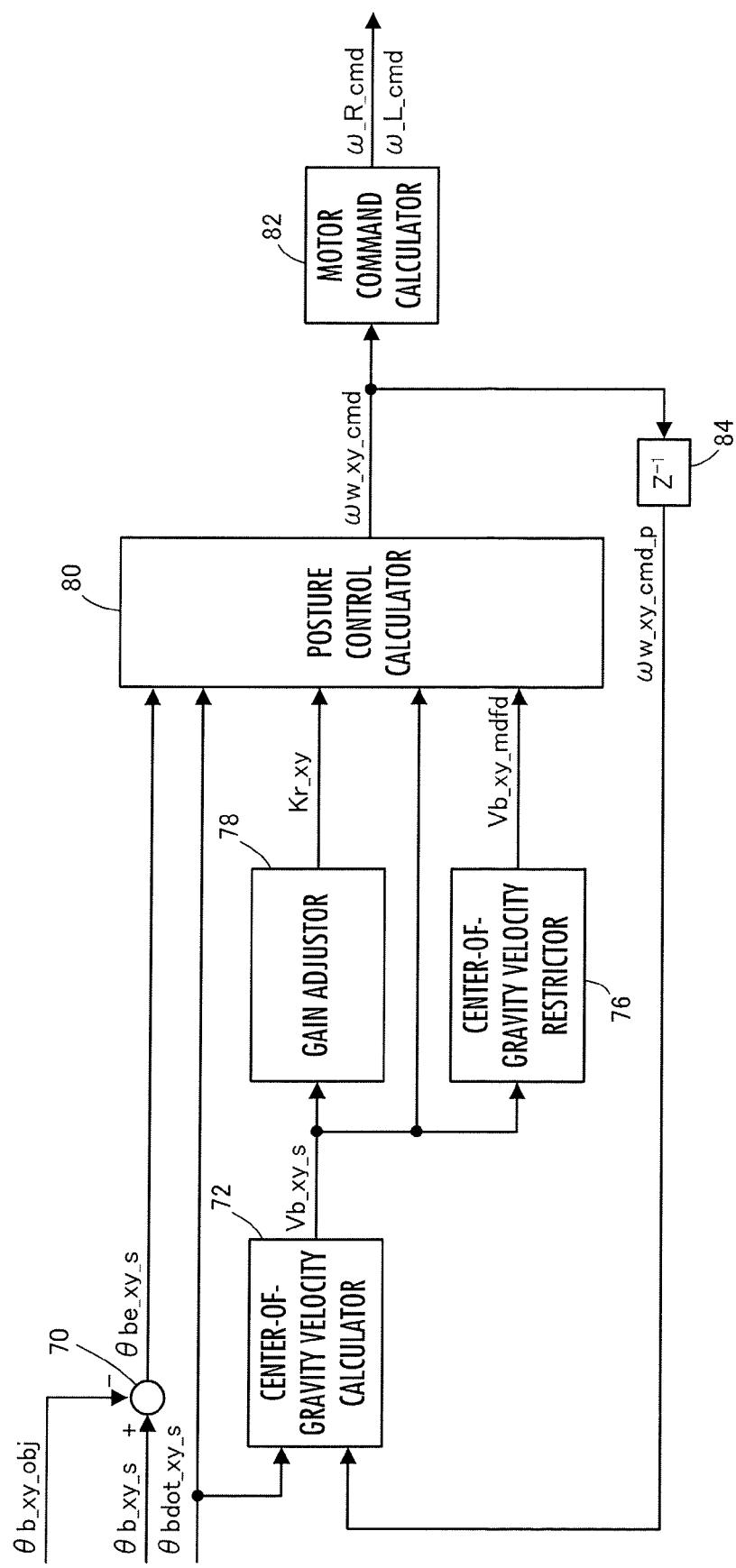
FIG. 8 is a block diagram illustrating a processing function related to the processing in STEP9 of FIG. 6.

The control unit 50 is provided with the functions illustrated in the block diagram of FIG. 8 as the functions for carrying out the vehicle control arithmetic processing in STEP9 as described above.

More specifically, the control unit 50 is provided with an error calculator 70 which calculates the base body tilt angle error measured value θbe_xy_s, which is the difference between the base body tilt angle measured value θb_xy_s and the base body tilt angle desired value θb_xy_obj, a center-of-gravity velocity calculator 72 which calculates an estimated center-of-gravity velocity value Vb_xy_s as an observed value of a center-of-gravity velocity Vb_xy, which is the moving velocity of the vehicle system center-of-gravity point, a center-of-gravity velocity restrictor 76 which determines a desired center-of-gravity velocity for control Vb_xy_mdfd as the desired value of the center-of-gravity velocity Vb_xy by taking into account a restriction based on a permissible range of the rotational angular velocities of the electric motors 31R and 31L, and a gain adjustor 78 which determines a gain adjustment parameter Kr_xy for adjusting the values of the gain coefficients of expressions 07x and 07y, which will be discussed later.

The control unit 50 is further provided with a posture control calculator 80 which calculates the imaginary wheel rotational angular velocity command ωw_xy_cmd, and a motor command calculator 82 which converts the imaginary wheel rotational angular velocity command ωw_xy_cmd into a pair of a velocity command ω_R_cmd (a command value of a rotational angular velocity) for the right electric motor 31R and a velocity command ω_L_cmd (a command value of a rotational angular velocity) for the left electric motor 31L.

Reference numeral 84 in FIG. 8 denotes a delay element which receives the imaginary wheel rotational angular velocity command ωw_xy_cmd calculated at each control processing cycle by the posture control calculator 80. The delay element 84 outputs a previous value ωw_xy_cmd_p of the imaginary wheel rotational angular velocity command ωw_xy_cmd at each control processing cycle.

In the vehicle control arithmetic processing in STEP9 described above, the processing by the aforesaid processing sections is carried out as described below.

The control unit 50 first carries out the processing by the error calculator 70 and the processing by the center-of-gravity velocity calculator 72.

The error calculator 70 receives the base body tilt angle measured values θb_xy_s (θb_x_s and θb_y_s) calculated in the aforesaid STEP2 and the desired values θb_xy_obj (θb_x_obj and θb_y_obj) set in the aforesaid STEP5 or STEP7. Then, the error calculator 70 subtracts θb_x_obj from θb_x_s to calculate the base body tilt angle error measured value θbe_x_s (=θb_x_s−θb_x_obj) in the direction about the Y-axis, and also subtracts θb_y_obj from θb_y_s to calculate the base body tilt angle error measured value θbe_y_s (=θb_y_s−θb_y_obj) in the direction about the X-axis.

The processing by the error calculator 70 may be carried out before the vehicle control arithmetic processing in STEP9. For example, the processing by the error calculator 70 may be carried out during the processing in the aforesaid STEP5 or STEP7.

The center-of-gravity velocity calculator 72 is input with the current value of the base body tilt angular velocity measured value θbdot_xy_s (θbdot_x_s and θbdot_y_s) calculated in STEP2, and also a previous value ωw_xy_cmd_p (ωw_x_cmd_p and ωw_y_cmd_p) of a imaginary wheel velocity command ωw_xy_cmd is input from a delay element 84. Thereafter, the center-of-gravity velocity calculator 72 calculates from these input values an estimated center-of-gravity velocity value Vb_xy_s (Vb_x_s and Vb_y_s), according to a predetermined arithmetic expression on the basis of the above-mentioned inverted pendulum model.

Specifically, the center-of-gravity velocity calculator 72 calculates Vb_x_s and Vb_y_s, respectively, from expressions 05x, 05y below.

$$Vb\_x\_s = Rw\_x \cdot \omega w\_x\_cmd\_p + h\_x \cdot \theta bdot\_x\_s \quad \quad 05x$$

$$Vb\_y\_s = Rw\_y \cdot \omega w\_y\_cmd\_p + h\_y \cdot \theta bdot\_y\_s \quad \quad 05y$$

In the expressions 05x, 05y, Rw_x, Rw_y are respective radius of the imaginary wheel 62_x, 62_y as is explained above, and these values are predetermined values set beforehand. Further, h_x, h_y are respective height of the mass point 60_x, 60_y of the inverted pendulum model. In the present embodiment, the height of the vehicle system center-of-gravity point is to be maintained substantially constant. Therefore, as the values of h_x, h_y, predetermined values set beforehand are used. Supplementally, height h_x, h_y are included in the constant parameter, the value of which is set in STEP 6 or STEP8.

The first term in the right side of the equation 05x is a moving velocity of the imaginary wheel 62_x in the X-axis direction corresponding to the previous value ωw_x_cmd_p of the velocity command of the imaginary wheel 62_x, and this moving velocity corresponds to the current value of the actual moving velocity of the wheel assembly 5 in the X-axis direction. Further, the second term in the right side of the equation 05x corresponds to the current value of the moving velocity of the vehicle system center-of-gravity point in the X-axis direction arising from the base body 9 tilting at the tilt angular velocity of θbdot_x_s about the Y-axis direction (relative moving velocity with respect to the wheel assembly 5). The same applies to equation 05y.

Here, a pair of the measured value (current value) of the rotational angular velocity of the electric motors 31R, 31L, respectively, that are measured on the basis of the outputs from the rotary encoders 56R, 56L, may be converted to a pair of the rotational angular velocity of the imaginary wheels 62_x, 62_y, respectively, and these rotational angular velocities may be used instead of ωw_x_cmd_p, ωw_y_cmd_p in equations 05x, 05y. However, in eliminating the influence of the noise included in the measured value of the rotational angular velocity, it is advantageous to use ωw_x_cmd_p, ωw_y_cmd_p which are desired values.

Subsequently, the control unit 50 carries out the processing by the center-of-gravity velocity restrictor 76 and the processing by the gain adjustor 78. In this case, the center-of-gravity velocity restrictor 76 and the gain adjustor 78 respectively receive the estimated center-of-gravity velocity values Vb_xy_s (Vb_x_s and Vb_y_s) calculated by the center-of-gravity velocity calculator 72 as described above.

Further, the gain adjustor 78 determines the gain adjustment parameters Kr_xy (Kr_x and Kr_y) on the basis of the input estimated center-of-gravity velocity values Vb_xy_s (Vb_x_s and Vb_y_s).

The processing by the gain adjustor 78 will be described below with reference to FIG. 9 and FIG. 10.

Figure 9:
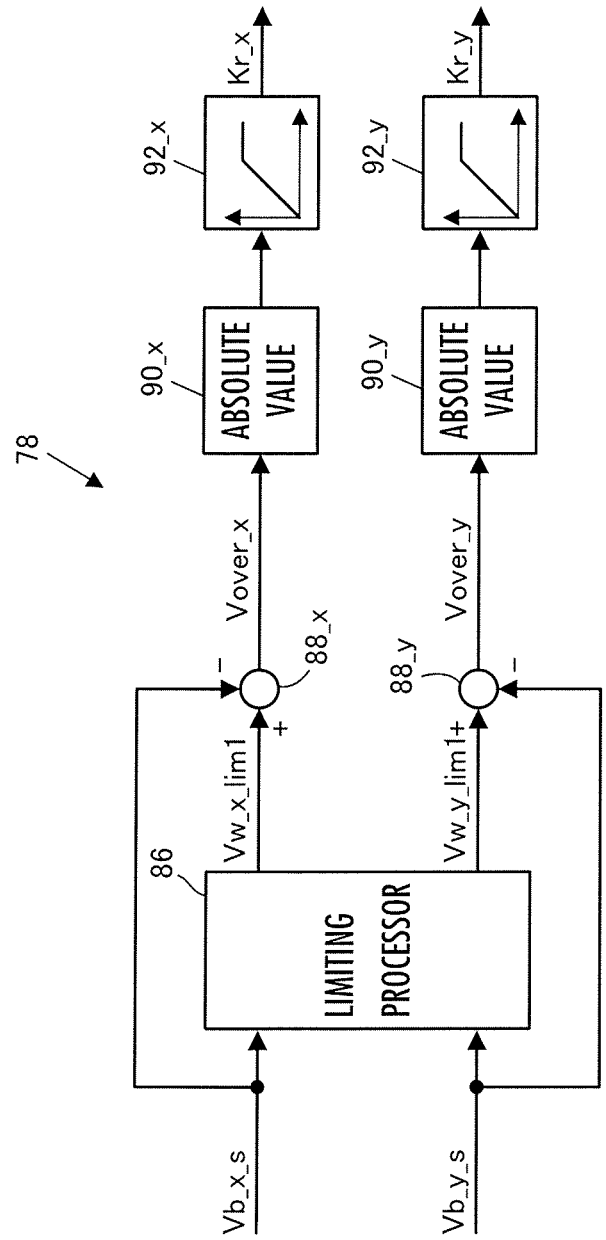
FIG. 9 is a block diagram illustrating a processing function of a gain adjusting element shown in FIG. 8.
Figure 10:
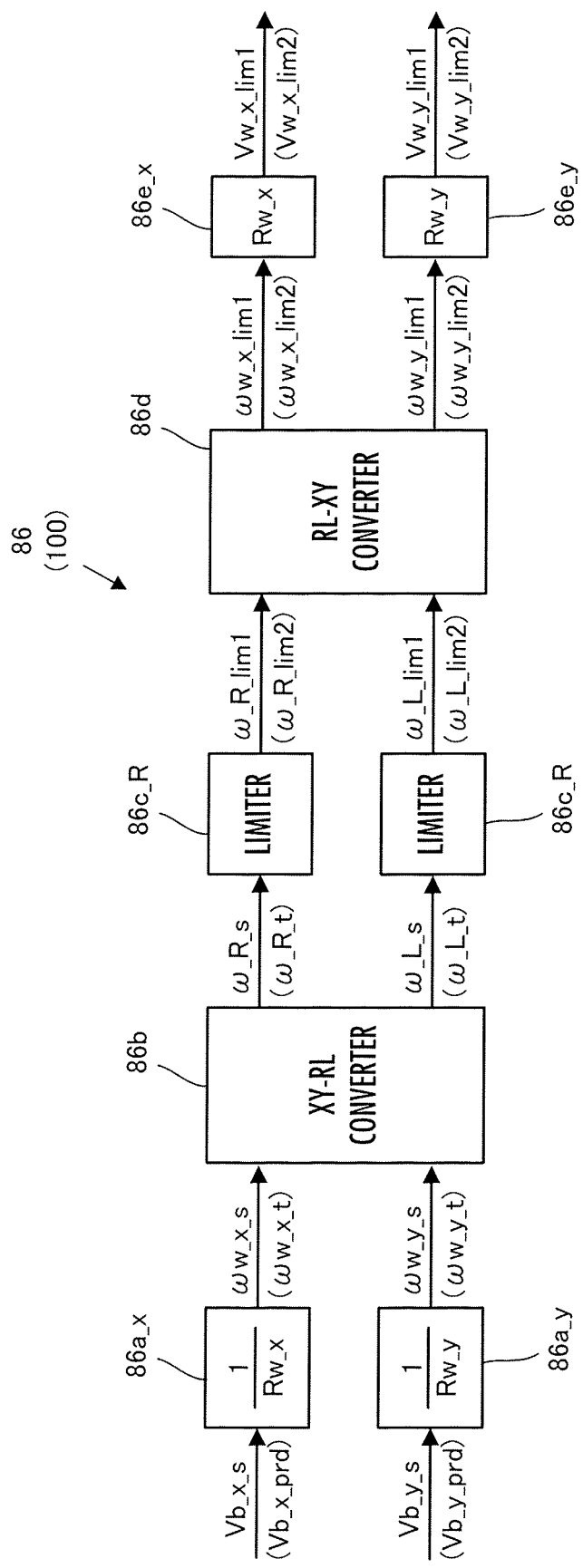
FIG. 10 is a block diagram illustrating a processing function of a limiting processor shown in FIG. 9 (or a limiting processor shown in FIG. 11)

As illustrated in FIG. 9, the gain adjustor 78 supplies the input estimated center-of-gravity velocity values Vb_x_s and Vb_y_s to a limiting processor 86. The limiting processor 86 adds, as appropriate, restrictions based on the permissible ranges of the rotational angular velocities of the electric motors 31R and 31L to the estimated center-of-gravity velocity values Vb_x_s and Vb_y_s, thereby generating output values Vw_x_lim1 and Vw_y_lim1. The output value Vw_x_lim1 means a value obtained after limiting the moving velocity Vw_x of the imaginary wheel 62_x in the X-axis direction and the output value Vw_y_lim1 means a value obtained after limiting the moving velocity Vw_y of the imaginary wheel 62_y in the Y-axis direction.

The processing by the limiting processor 86 will be described in further detail with reference to FIG. 10. The parenthesized reference characters in FIG. 10 denote the processing by a limiting processor 104 of the center-of-gravity velocity restrictor 76, which will be discussed later, and may be ignored in the description related to the processing by the limiting processor 86.

The limiting processor 86 first supplies the estimated center-of-gravity velocity values Vb_x_s and Vb_y_s to processors 86a_x and 86a_y, respectively. The processor 86a_x divides Vb_x_s by the radius Rw_x of the imaginary wheel 62_x to calculate the rotational angular velocity ωw_x_s of the imaginary wheel 62_x in the case where it is assumed that the moving velocity of the imaginary wheel 62_x in the X-axis direction coincides with Vb_x_s. Similarly, the processor 86a_y calculates the rotational angular velocity ωw_y_s of the imaginary wheel 62_y (=Vb_y_s/Rw_y) in the case where it is assumed that the moving velocity of the imaginary wheel 62_y in the Y-axis direction coincides with Vb_y_s.

Subsequently, the limiting processor 86 converts the pair of ωw_x_s and ωw_y_s into a pair of the rotational angular velocity ω_R_s of the electric motor 31R and the rotational angular velocity ω_L_s of the electric motor 31L by an XY-RL converter 86b.

According to the present embodiment, the conversion is implemented by solving a simultaneous equation obtained by replacing ωw_x, ωw_y, ω_R and ω_L of the aforesaid expressions 01a and 01b by ωw_x_s, ωw_y_s, ω_R_s and ω_L_s, respectively, taking the ω_R_s and ω_L_s as unknowns.

Subsequently, the limit processor 86 supplies the output values ω_R_s and ω_L_s of the XY-RL converter 86b to limiters 86c_R and 86c_L, respectively. At this time, the limiter 86c_R directly outputs the ω_R_s as an output value ω_R_lim1 if the ω_R_s falls within the permissible range for the right motor, which has an upper limit value (>0) and a lower limit value (<0) of predetermined values set beforehand. If the ω_R_s deviates from the permissible range for the right motor, then the limiter 86c_R outputs, as the output value ω_R_lim1, a boundary value of the upper limit value or the lower limit value of the permissible range for the right motor whichever is closer to the ω_R_s. Thus, the output value ω_R_lim1 of the limiter 86c_R is limited to a value within the permissible range for the right motor.

Similarly, the limiter 86c_L directly outputs the ω_L_s as an output value ω_L_lim1 if the ω_L_s falls within the permissible range for the left motor, which has an upper limit value (>0) and a lower limit value (<0) of predetermined values set beforehand. If the ω_L_s deviates from the permissible range for the left motor, then the limiter 86c_L outputs, as the output value ω_L_lim1, a boundary value of the upper limit value or the lower limit value of the permissible range for the left motor whichever is closer to the ω_L_s. Thus, the output value ω_L_lim1 of the limiter 86c_L is limited to a value within the permissible range for the left motor.

The permissible range for the right motor described above is a permissible range which has been set so as to prevent the rotational angular velocity (absolute value) of the right electric motor 31R from becoming excessively high thereby to prevent the maximum value of the torque that can be output by the electric motor 31R from decreasing. This applies also to the permissible range for the left motor.

Subsequently, the limit processor 86 converts the pair of the output values ω_R_lim1 and ω_L_lim1 of the limiters 86c_R and 86c_L, respectively, into a pair of the rotational angular velocities ωw_x_lim1 and ωw_y_lim1 of the imaginary wheels 62_x and 62_y, respectively, by an RL-XY converter 86d.

The conversion is the processing of the inverse conversion of the processing of the conversion by the aforesaid XY-RL converter 86b. This processing is implemented by solving a simultaneous equation obtained by replacing ωw_x, ωw_y, ω_R and ω_L of the aforesaid expressions 01a and 01b by ωw_x_lim1, ωw_y_lim1, ω_R_lim1 and ω_L_lim1, respectively, taking the ωw_x_lim1 and ωw_y_lim1 as unknowns.

Subsequently, the limit processor 86 supplies the output values ωw_x_lim1 and ωw_y_lim1 of the RL-XY converter 86d to processors 86e_x and 86e_y, respectively. The processor 86e_x multiplies ωw_x_lim1 by the radius Rw_x of the imaginary wheel 62_x to convert ωw_x_lim1 into the moving velocity Vw_x_lim1 of the imaginary wheel 62_x. In the same manner, the processor 86e_y converts ωw_y_lim1 into the moving velocity Vw_y_lim1 of the imaginary wheel 62_y (=ωw_y_lim1·Rw_y).

If it is assumed that the processing by the limiting processor 86 described above causes the moving velocity Vw_x of the imaginary wheel 62_x in the X-axis direction and the moving velocity Vw_y of the imaginary wheel 62_y in the Y-axis direction to agree with the estimated center-of-gravity velocity values Vb_x_s and Vb_y_s, respectively (in other words, if it is assumed that the moving velocity of the wheel assembly 5 in the X-axis direction and the moving velocity in the Y-axis direction are set to agree with Vb_x_s and Vb_y_s, respectively), then the pair of output values Vw_x_lim1 and Vw_y_lim1 coinciding with Vb_x_s and Vb_y_s, respectively, is output from the limiting processor 86 if the rotational angular velocities ω_R_s and ω_L_s of the electric motors 31R and 31L, respectively, which are required for achieving the moving velocities, both fall within permissible ranges.

Meanwhile, if both or one of the rotational angular velocities ω_R_s and ω_L_s of the electric motors 31R and 31L, respectively, deviates from the permissible range or ranges, then both or one of the rotational angular velocities is forcibly limited to be within the permissible range, and a pair of the moving velocities in the X-axis direction and the Y-axis direction Vw_x_lim1 and Vw_y_lim1 corresponding to a pair of the limited rotational angular velocities ω_R_lim1 and ω_L_lim1 of the electric motors 31R and 31L, respectively, is output from the limiting processor 86.

Hence, the limiting processor 86 generates a pair of output values Vw_x_lim1 and Vw_y_lim1 such that the output values Vw_x_lim1 and Vw_y_lim1 agree with Vb_x_s and Vb_y_s, respectively, as much as possible under an essential required condition that the rotational angular velocities of the electric motors 31R and 31L corresponding to the pair of the output values Vw_x_lim1 and Vw_y_lim1, respectively, do not deviate from the permissible ranges.

Referring back to the description of FIG. 9, the gain adjustor 78 then carries out the processing by calculators 88_x and 88_y. The calculator 88_x receives the estimated center-of-gravity velocity value in the X-axis direction Vb_x_s and the output value Vw_x_lim1 of the limiting processor 86. Then, the calculator 88_x calculates a value Vover_x obtained by subtracting Vb_x_s from Vw_x_lim1 and outputs the value Vover_x. Further, the calculator 88_y receives the estimated center-of-gravity velocity value in the Y-axis direction Vb_y_s and the output value Vw_y_lim1 of the limiting processor 86. Then, the calculator 88_y calculates a value Vover_y obtained by subtracting Vb_y_s from Vw_y_lim1 and outputs the value Vover_y.

In this case, if the output values Vw_x_lim1 and Vw_y_lim1 are not forcibly restricted by the limiting processor 86, then Vw_x_lim1=Vb_x_s and Vw_y_lim1=Vb_y_s. Therefore, the output values Vover_x and Vover_y of the calculators 88_x and 88_y, respectively, will be both zero.

Meanwhile, if the output values Vw_x_lim1 and Vw_y_lim1 of the limiting processor 86 are generated by forcibly restricting the input values Vb_x_s and Vb_y_s, then a corrected amount from Vb_x_s of Vw_x_lim1 (=Vw_x_lim1−Vb_x_s) and a corrected amount from Vb_y_s of Vw_y_lim1 (=Vw_y_lim1−Vb_y_s) will be output from the calculators 88_x and 88_y, respectively.

Subsequently, the gain adjustor 78 passes the output value Vover_x of the calculator 88_x through processors 90_x and 92_x in this order thereby to determine the gain adjustment parameter Kr_x. Further, the gain adjustor 78 passes the output value Vover_y of the calculator 88_y through processors 90_y and 92_y in this order thereby to determine the gain adjustment parameter Kr_y. The gain adjustment parameters Kr_x and Kr_y both take values within the range from 0 to 1.

The processor 90_x calculates and outputs the absolute value of the input Vover_x. Further, the processor 92_x generates Kr_x such that the output value Kr_x monotonously increases relative to an input value |Vover_x| and has a saturation characteristic. The saturation characteristic is a characteristic in which a change amount of an output value relative to an increase in an input value becomes zero or approaches to zero when the input value increases to a certain level.

In this case, according to the present embodiment, if the input value |Vover_x| is a preset, predetermined value or less, then the processor 92_x outputs, as Kr_x, a value obtained by multiplying the input value |Vover_x| by a proportionality coefficient of a predetermined value. Further, if the input value |Vover_x| is larger than the predetermined value, then the processor 92_x outputs 1 as Kr_x. Incidentally, the proportionality coefficient is set such that the product of |Vover_x| and the proportionality coefficient becomes 1 when |Vover_x| agrees with a predetermined value.

The processing by processors 90_y and 92_y is the same as that carried out by the processors 90_x and 92_x, respectively, described above.

If the output values Vw_x_lim1 and Vw_y_lim1 in the limiting processor 86 are not forcibly restricted by the processing carried out by the gain adjustor 78 described above, that is, if the rotational angular velocities of the electric motors 31R and 31L fall within the permissible ranges even when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, respectively, then the gain adjustment parameters Kr_x and Kr_y are both determined to be zero. Therefore, normally, Kr_x=Kr_y=0.

Meanwhile, if the output values Vw_x_lim1 and Vw_y_lim1 of the limiting processor 86 are generated by forcibly restricting the input values Vb_x_s and Vb_y_s, that is, if the rotational angular velocity of one of the electric motors 31R and 31L deviates from the permissible range (if the absolute value of one of the rotational angular velocities becomes excessively high) when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, then the values of the gain adjustment parameters Kr_x and Kr_y are determined on the basis of the absolute values of the aforesaid corrected amounts Vover_x and Vover_y, respectively. In this case, Kr_x is determined to be a larger value as the absolute value of the corrected amount Vover_x increases, the upper limit value thereof being 1. The same applies to Kr_y.

Figure 11:
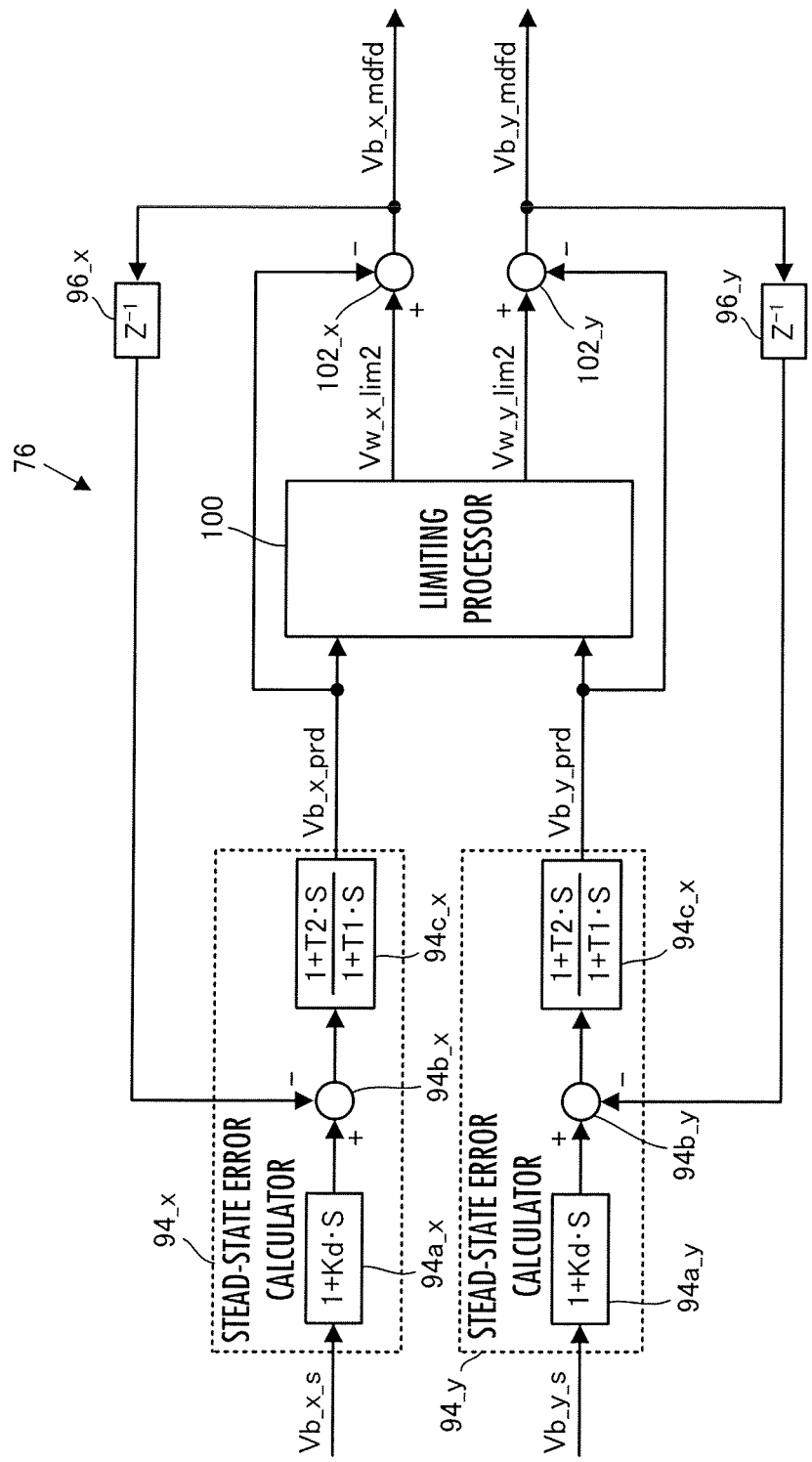
FIG. 11 is a block diagram illustrating a processing function of a center-of-gravity velocity restrictor 76 shown in FIG. 8.

The center-of-gravity velocity restrictor 76 determines the desired center-of-gravity velocities for control Vb_xy_mdfd (Vb_x_mdfd and Vb_y_mdfd), by executing the process shown in the block diagram of FIG. 11, using the input estimated center-of-gravity velocity values Vb_xy_s (Vb_x_s and Vb_y_s).

To be more specific, the center-of-gravity velocity restrictor 76 first carries out the processing by stead-state error calculators 94_x and 94_y.

In this case, the stead-state error calculator 94_x receives the estimated center-of-gravity velocity value in the X-axis direction Vb_x_s and also receives the previous value Vb_x_mdfd_p of the desired center-of-gravity velocity for control in the X-axis direction Vb_x_mdfd through the intermediary of a delay element 96_x. Then, in the stead-state error calculator 94_x, first, the input Vb_x_s is supplied to a proportional-differential compensation component (PD compensation component) 94a_x. The proportional-differential compensation component 94a_x is a compensation component whose transfer function is denoted by 1+Kd·S, and adds the input Vb_x_s and the value obtained by multiplying the differential value thereof (temporal change rate) by a coefficient Kd of a predetermined value, and outputs the value resulting from the addition.

Subsequently, the stead-state error calculator 94_x calculates, by a calculator 94b_x, the value obtained by subtracting the input Vb_x_mdfd_p from the output value of the proportional-differential compensation component 94a_x, then supplies the output value of the calculator 94b_x to a low-pass filter 94c_x having a phase compensation function. The low-pass filter 94c_x is a filter whose transfer function is denoted by (1+T2·S)/(1+T1·S). Then, the stead-state error calculator 94_x outputs the output value Vb_x_prd of the low-pass filter 94c_x.

Further, the stead-state error calculator 94_y receives the estimated center-of-gravity velocity value in the Y-axis direction Vb_y_s and also receives the previous value Vb_y_mdfd_p of the desired center-of-gravity velocity for control in the Y-axis direction Vb_y_mdfd through the intermediary of a delay element 96_y.

Then, as with the stead-state error calculator 94_x described above, the stead-state error calculator 94_y carries out the processing by a proportional-differential compensation component 94a_y, a calculator 94b_y, and a low-pass filter 94c_y in order and outputs an output value Vb_y_prd of the low-pass filter 94c_y.

Here, the output value Vb_x_prd of the stead-state error calculator 94_x has a meaning as a stead-state error of a future estimated center-of-gravity velocity value in the X-axis direction presumed from a current motion state of the vehicle system center-of-gravity point observed from the Y-axis direction (in other words, the motion state of the mass point 60_x of the inverted pendulum model observed from the Y-axis direction) relative to the desired center-of-gravity velocity for control Vb_x_mdfd of an expected convergence value. Similarly, the output value Vb_y_prd of the stead-state error calculator 94_y has a meaning as a stead-state error of a future estimated center-of-gravity velocity value in the Y-axis direction presumed from a current motion state of the vehicle system center-of-gravity point observed from the X-axis direction (in other words, the motion state of the mass point 60_y of the inverted pendulum model observed from the X-axis direction) relative to the desired center-of-gravity velocity for control Vb_y_mdfd of an expected convergence value. Hereinafter, the output values Vb_x_prd and Vb_y_prd of the stead-state error calculators 94_x and 94_y, respectively, will be referred to as the predicted center-of-gravity velocity stead-state error values.

After executing the process of the stead-state error calculators 94_x and 94_y as explained above, the center-of-gravity velocity restrictor 76 inputs the predicted center-of-gravity velocity stead-state error values Vb_x_prd and Vb_y_prd, respectively, to a limiting processor 100. The processing by the limiting processor 100 is the same as the processing by the limiting processor 86 of the gain adjustor 78 described above. In this case, as indicated by the parenthesized reference characters in FIG. 10, only the input values and the output values of the individual processing sections of the limiting processor 100 are different from those of the limiting processor 86.

To be more specific, in the limiting processor 100, rotational angular velocities ωw_x_t and ωw_y_t of the imaginary wheels 62_x and 62_y in the case where it is assumed that the moving velocities Vw_x and Vw_y of the imaginary wheels 62_x and 62_y, respectively, coincide with Vb_x_prd and Vb_y_prd, respectively, are calculated by the processors 86a_x and 86a_y, respectively. Then, the pair of the rotational angular velocities ωw_x_t and ωw_y_t is converted into the pair of the rotational angular velocities ω_R_t and ω_L_t of the electric motors 31R and 31L by the XY-RL converter 86b.

Further, these rotational angular velocities ω_R_t and ω_L_t are limited to values within the permissible range for the right motor and the permissible range for the left motor, respectively, by limiters 86c_R and 86c_L. Then, the values ω_R_lim2 and ω_L_lim2, which have been subjected to the limitation processing, are converted by the RL-XY converter 86d into the rotational angular velocities ωw_x_lim2 and ωw_y_lim2 of the imaginary wheels 62_x and 62_y.

Subsequently, the moving velocities Vw_x_lim2 and Vw_y_lim2 of the imaginary wheels 62_x and 62_y corresponding to the rotational angular velocities ωw_x_lim2 and ωw_y_lim2 are calculated by the processors 86e_x and 86e_y, respectively, and these moving velocities Vw_x_lim2 and Vw_y_lim2 are output from the limiting processor 100.

By carrying out the processing by the limiting processor 100 described above, the limiting processor 100 generates a pair of output values Vw_x_lim2 and Vw_y_lim2 such that the output values Vw_x_lim2 and Vw_y_lim2 agree with Vb_x_t and Vb_y_t, respectively, as much as possible under an essential required condition that the rotational angular velocities of the electric motors 31R and 31L corresponding to the pair of the output values Vw_x_lim2 and Vw_y_lim2, respectively, do not deviate from the permissible ranges, as with the limiting processor 86.

Incidentally, the permissible ranges for the right motor and left motor in the limiting processor 100 do not have to be the same as the permissible ranges in the limiting processor 86, and may be set to be permissible ranges that are different from each other.

Referring back to the description of FIG. 11, the center-of-gravity velocity restrictor 76 then carries out the processing by calculators 102_x and 102_y to calculate the desired center-of-gravity velocities for control Vb_x_mdfd and Vb_y_mdfd, respectively. In this case, the calculator 102_x calculates a value, which is obtained by subtracting the predicted center-of-gravity velocity stead-state error value in the X-axis direction Vb_x_prd from the output value Vw_x_lim2 of the limiting processor 100, as the desired center-of-gravity velocity for control in the X-axis direction Vb_x_mdfd. Similarly, the calculator 102_y calculates a value, which is obtained by subtracting the predicted center-of-gravity velocity stead-state error value in the Y-axis direction Vb_y_prd from the output value Vw_y_lim2 of the limiting processor 100, as the desired center-of-gravity velocity for control in the Y-axis direction Vb_y_mdfd.

Regarding the desired center-of-gravity velocities for control Vb_x_mdfd and Vb_y_mdfd determined as described above, in the case where the output values Vw_x_lim2 and Vw_y_lim2 are not forcibly restricted by the limiting processor 100, that is, in the case where the rotational angular velocities of the electric motors 31R and 31L fall within the permissible ranges even when the electric motors 31R and 31L are operated such that the moving velocities of the wheel assembly 5 in the X-axis direction and the Y-axis direction, respectively, agree with the predicted center-of-gravity velocity stead-state error values Vb_x_prd and Vb_y_prd, respectively, the desired center-of-gravity velocities for control Vb_x_mdfd and Vb_y_mdfd are both determined to be "0". Therefore, normally, Vb_x_mdfd=Vb_y_mdfd=0.

Meanwhile, if the output values Vw_x_lim2 and Vw_y_lim2 of the limiting processor 100 are generated by forcibly restricting the input values Vb_x_t and Vb_y_t, that is, if the rotational angular velocity of one of the electric motors 31R and 31L deviates from the permissible range (if the absolute value of one of the rotational angular velocities becomes excessively high) when the electric motors 31R and 31L are operated such that the moving velocities of the wheel assembly 5 in the X-axis direction and the Y-axis direction, respectively, agree with the predicted center-of-gravity velocity stead-state error values Vb_x_prd and Vb_y_prd, then for the X-axis direction, a correction amount from the input value Vb_x_prd of the output value Vw_x_lim2 of the limiting processor 100 (=Vw_x_lim2−Vb_x_prd) is determined as the desired center-of-gravity velocity for control Vb_x_mdfd in the X-axis direction.

Further, regarding the Y-axis direction, a correction amount from the input value Vb_y_prd of the output value Vw_y_lim2 of the limiting processor 100 (=Vw_y_lim2−Vb_y_prd) is determined as the desired center-of-gravity velocity for control Vb_y_mdfd in the Y-axis direction.

In this case, for example with respect to the velocity in the X-axis direction, the desired center-of-gravity velocity for control Vb_x_mdfd becomes the velocity in opposite direction from the predicted center-of-gravity velocity stead-state error value Vb_x_prd in the X-axis direction which is output from the stead-state error calculator 94_x. The same applies to the velocity in the Y-axis direction.

The above has described the processing by the center-of-gravity velocity restrictor 76.

Returning to the description of FIG. 8, after carrying out the processing by the center-of-gravity velocity restrictor 76, the gain adjustor 78, and the error calculator 70 as described above, the control unit 50 carries out the processing by the posture control calculator 80.

Figure 12:
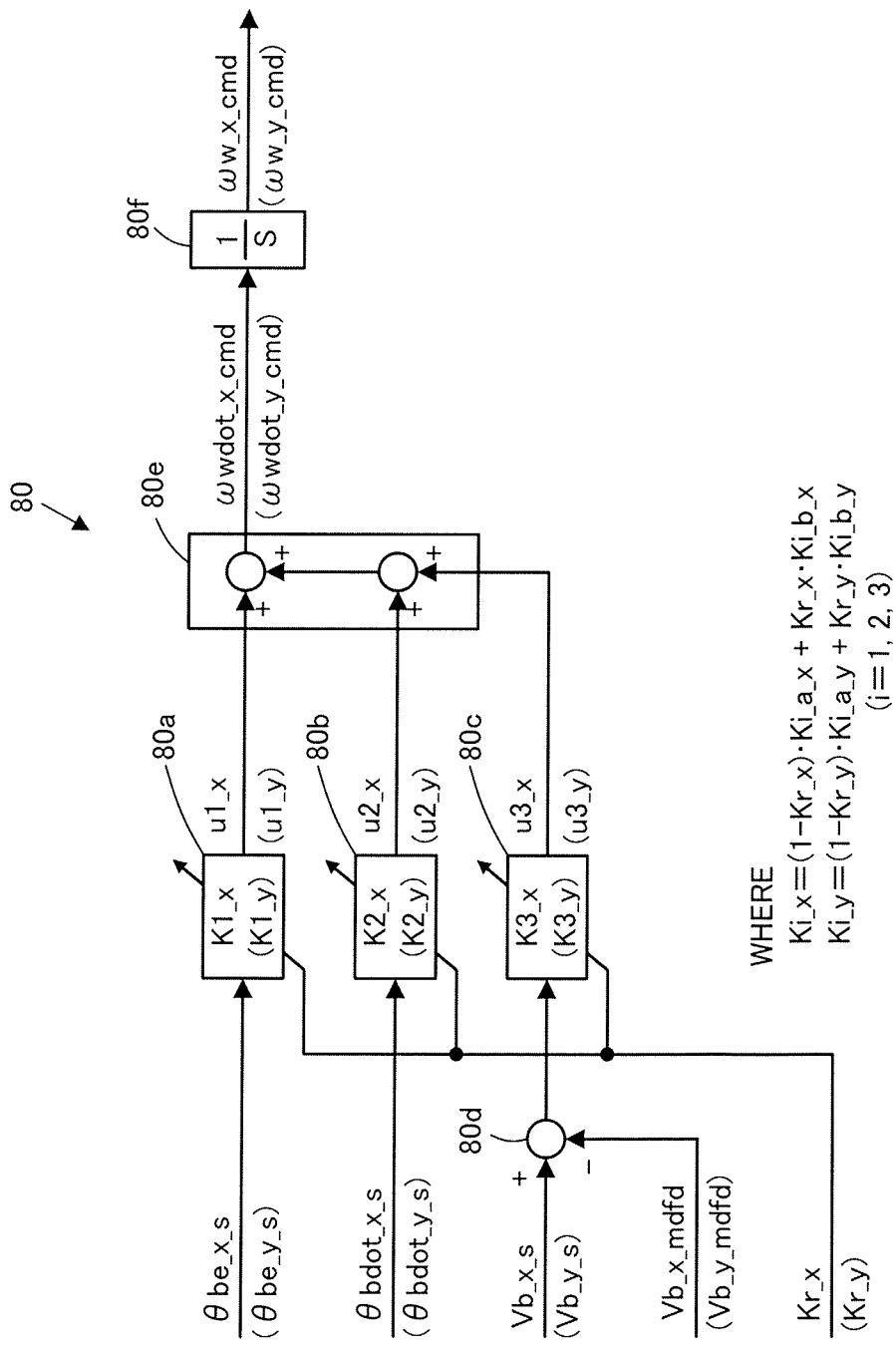
FIG. 12 is a block diagram illustrating a processing function of a posture control calculator 80 shown in FIG. 8.

The processing by the posture control calculator 80 will be described below by referring to FIG. 12. Incidentally, the unparenthesized reference characters in FIG. 12 are the reference characters related to the processing for determining the aforesaid imaginary wheel rotational angular velocity command ωw_x_cmd, which is the desired value of the rotational angular velocity of the imaginary wheel 62_x circum-rotating in the X-axis direction. The parenthesized reference characters are the reference characters related to the processing for determining the aforesaid imaginary wheel rotational angular velocity command ωw_y_cmd, which is the desired value of the rotational angular velocity of the imaginary wheel 62_y circumrotating in the Y-axis direction.

The posture control calculator 80 receives the base body tilt angle error measured value θbe_xy_s calculated by the error calculator 70, the base body tilt angular velocity measured values θbdot_xy_s calculated in the aforesaid STEP2, the estimated center-of-gravity velocity values Vb_xy_s calculated by the center-of-gravity velocity calculator 72, the desired center-of-gravity velocities for control Vb_xy_mdfd calculated by the center-of-gravity velocity restrictor 76, and the gain adjustment parameters Kr_xy calculated by the gain adjustor 78.

Then, the posture control calculator 80 first calculates the imaginary wheel rotational angular acceleration commands ωwdot_xy_cmd according to the following expressions 07x and 07y by using the above received values.

$$\omega wdot\_x\_cmd = K1\_x \cdot \theta be\_x\_s + K2\_x \cdot \theta bdot\_x\_s + K3\_x \cdot (Vb\_x\_s - Vb\_x\_mdfd) \quad \text{Expression 07x}$$

$$\omega wdot\_y\_cmd = K1\_y \cdot \theta be\_y\_s + K2\_y \cdot \theta bdot\_y\_s + K3\_y \cdot (Vb\_y\_s - Vb\_y\_mdfd) \quad \text{Expression 07y}$$

Hence, according to the present embodiment, the imaginary wheel rotational angular acceleration command ωwdot_x_cmd denoting the manipulated variable (control input) for controlling the motion of the mass point 60_x of the inverted pendulum model observed from the Y-axis direction (i.e., the motion of the vehicle system center-of-gravity point observed from the Y-axis direction), and the imaginary wheel rotational angular acceleration command ωwdot_y_cmd denoting the manipulated variable (control input) for controlling the motion of the mass point 60_y of the inverted pendulum model observed from the X-axis direction (i.e., the motion of the vehicle system center-of-gravity point observed from the X-axis direction) are determined by adding up three manipulated variable components (the three terms of the right side of each of expressions 07x and 07y).

The gain coefficients K1_x, K1_y in these expressions 07x, 07y are feedback gains related to the tilt angle of the base body 9 (or the seat 3), the gain coefficients K2_x, K2_y are feedback gains related to the tilt angular velocity (temporal change rate) of the base body 9 (or the seat 3), and the gain coefficients K3_x, K3_y are feedback gains related to the moving velocity of the vehicle system center-of-gravity point (a predetermined representative point of the vehicle 1).

In this case, the gain coefficients K1_x, K2_x, and K3_x related to the manipulated variable components in expression 07x are variably set on the basis of the gain adjustment parameter Kr_x, while the gain coefficients K1_y, K2_y, and K3_y related to the manipulated variable components in expression 07y are variably set on the basis of the gain adjustment parameter Kr_y. Hereinafter, the gain coefficients K1_x, K2_x, and K3_x in expression 07x may be referred to as the first gain coefficient K1_x, the second gain coefficient K2_x, and the third gain coefficient K3_x, respectively. The same applies to the gain coefficients K1_y, K2_y, and K3_y in expression 07y.

An i-th gain coefficient Ki_x (i=1, 2, or 3) in expression 07x and an i-th gain coefficient Ki_y (i=1, 2, or 3) in expression 07y are determined on the basis of the gain adjustment parameters Kr_x and Kr_y according to expressions 09x and 09y given below, as indicated by the note in FIG. 12.

$$Ki\_x = (1-Kr\_x) \cdot Ki\_a\_x + Kr\_x \cdot Ki\_b\_x \quad \text{Expression 09x}$$

$$Ki\_y = (1-Kr\_y) \cdot Ki\_a\_y + Kr\_y \cdot Ki\_b\_y \quad \text{Expression 09y}$$

(i=1, 2, 3)

Here, Ki_a_x and Ki_b_x in expression 09x denote constant values set beforehand as the gain coefficient values on a minimum end (an end close to zero) of the i-th gain coefficient Ki_x and as the gain coefficient value on a maximum end (an end away from zero), respectively. The same applies to Ki_a_y and Ki_b_y in expression 09y.

Thus, each i-th gain coefficient Ki_x (i=1, 2 or 3) used in the calculation of expression 07x is determined as a weighed mean value of the constant values Ki_a_x and Ki_b_x corresponding thereto. Further, in this case, the weight applied to each of Ki_a_x and Ki_b_x is changed according to the gain adjustment parameter Kr_x. Therefore, if Kr_x=0, then Ki_x=Ki_a_x, and if Kr_x=1, then Ki_x=Ki_b_x. As Kr_x approaches 1 from 0, the i-th gain coefficient Ki_x approaches Ki_b_x from Ki_a_x.

Similarly, each i-th gain coefficient Ki_y (i=1, 2 or 3) used in the calculation of expression 07y is determined as a weighed mean value of the constant values Ki_a_y and Ki_b_y corresponding thereto. Further, in this case, the weight applied to each of Ki_a_y and Ki_b_y is changed according to the gain adjustment parameter Kr_y. Therefore, as with the case of Ki_x, as the value of Kr_y changes from 0 to 1, the value of the i-th gain coefficient Ki_y changes between Ki_a_y and Ki_b_y.

As is explained above, Kr_x and Kr_y are normally (to be more specific, in the case where the output values Vw_x_lim1 and Vw_y_lim1 are not forcibly restricted at the limit processor 86 of the gain adjustor 78), "0". Therefore, the i-th gain coefficient Ki_x and Ki_y (i=1, 2 or 3) normally become Ki_x=Ki_a_x and Ki_y=Ki_a_y, respectively.

Supplementally, the aforesaid constant values Ki_a_x, Ki_b_x and Ki_a_y, Ki_b_y (i=1, 2 or 3) are included in the constant parameters, the values of which are set in the aforesaid STEP6 or STEP8.

The posture control calculator 80 uses the first to the third gain coefficients K1_x, K2_x, and K3_x determined as described above to perform the calculation of the above expression 07x, thereby calculating the imaginary wheel rotational angular acceleration command ωwdot_x_cmd related to the imaginary wheel 62_x circumrotating in the X-axis direction.

More detailedly, referring to FIG. 12, the posture control calculator 80 calculates a manipulated variable component u1_x obtained by multiplying the base body tilt angle error measured value θbe_x_s by the first gain coefficient K1_x and a manipulated variable component u2_x obtained by multiplying the base body tilt angular velocity measured value θbdot_x_s by the second gain coefficient K2_x by processors 80a and 80b, respectively. Further, the posture control calculator 80 calculates the difference between the estimated center-of-gravity velocity value Vb_x_s and the desired center-of-gravity velocity for control Vb_x_mdfd (=Vb_x_s−Vb_x_mdfd) by a calculator 80d, and calculates, by a processor 80c, a manipulated variable component u3_x obtained by multiplying the calculated difference by the third gain coefficient K3_x. Then, the posture control calculator 80 adds up these manipulated variable components u1_x, u2_x, and u3_x by a calculator 80e so as to calculate the imaginary wheel rotational angular acceleration command ωwdot_x_cmd.

Similarly, the posture control calculator 80 carries out the calculation of the above expression 07y by using the first to the third gain coefficients K1_y, K2_y, and K3_y determined as described above, thereby calculating the imaginary wheel rotational angular acceleration command ωwdot_y_cmd related to the imaginary wheel 62_y circumrotating in the Y-axis direction.

In this case, the posture control calculator 80 calculates a manipulated variable component u1_y obtained by multiplying the base body tilt angle error measured value θbe_y_s by the first gain coefficient K1_y and a manipulated variable component u2_y obtained by multiplying the base body tilt angular velocity measured value θbdot_y_s by the second gain coefficient K2_y by the processors 80a and 80b, respectively. Further, the posture control calculator 80 calculates the difference between the estimated center-of-gravity velocity value Vb_y_s and the desired center-of-gravity velocity for control Vb_y_mdfd (=Vb_y_s−Vb_y_mdfd) by the calculator 80d, and calculates, by the processor 80c, a manipulated variable component u3_y obtained by multiplying the calculated difference by the third gain coefficient K3_y. Then, the posture control calculator 80 adds up these manipulated variable components u1_y, u2_y, and u3_y by the calculator 80e so as to calculate the imaginary wheel rotational angular acceleration command ωwdot_y_cmd.

Here, the first term (=the first manipulated variable component u1_x) and the second term (=the second manipulated variable component u2_x) of the right side of expression 07x mean the feedback manipulated variable components for converging the base body tilt angle error measured value θbe_x_s in the direction about the X-axis to zero (converging the base body tilt angle measured value θb_x_s to the desired value θb_x_obj) by the PD law (proportional-differential law) serving as the feedback control law.

Further, the third term (=the third manipulated variable component u3_x) of the right side of expression 07x means a feedback manipulated variable component for converging the difference between the estimated center-of-gravity velocity value Vb_x_s and the desired center-of-gravity velocity for control Vb_x_mdfd to zero (converging Vb_x_s to Vb_x_mdfd) by a proportional law serving as the feedback control law.

The same applies to the first to the third terms (the first to the third manipulated variable components u1_y, u2_y, and u3_y) of the right side of expression 07y.

As is explained above, normally (to be more specific, in the case where the output values V_x_lim2 and V_y_lim2 are not forcibly limited at the limit processor 100 of the center-of-gravity velocity restrictor 76), the desired center-of-gravity velocities for control Vb_x_mdfd and Vb_y_mdfd are "0". And, in the normal case where Vb_x_mdfd=Vb_y_mdfd=0, the third manipulated variable components u3_x and u3_y, respectively, coincide with the value obtained by multiplying the third gain coefficients K3_x and K3_y with the estimated center-of-gravity velocity values Vb_x_s and Vb_y_s, respectively.

After calculating the imaginary wheel rotational angular acceleration commands ωwdot_x_cmd and ωwdot_y_cmd as described above, the posture control calculator 80 integrates these ωwdot_x_cmd and ωwdot_y_cmd by an integrator 80f thereby to determine the aforesaid imaginary wheel rotational velocity commands ωw_x_cmd and ωw_y_cmd.

The above has described the details of the processing by the posture control calculator 80.

Supplementally, the imaginary wheel rotational angular acceleration command ωwdot_x_cmd may alternatively be calculated by an expression wherein the third term of the right side of expression 07x is separated into the manipulated variable component based on Vb_x_s (=K3_x·Vb_x_s) and the manipulated variable component based on Vb_x_mdfd (=−K3_x·Vb_x_mdfd). Similarly, the imaginary wheel rotational angular acceleration command ωwdot_y_cmd may alternatively be calculated by an expression wherein the third term of the right side of expression 07y is separated into the manipulated variable component based on Vb_y_s (=K3_y·Vb_y_s) and the manipulated variable component based on Vb_y_mdfd (=−K3_y·Vb_y_mdfd).

Further, in the present embodiment, the rotational angular acceleration commands ωdotw_x_cmd and ωdotw_y_cmd of the imaginary wheels 62_x and 62_y have been used as the manipulated variables (control inputs) for controlling the behaviors of the vehicle system center-of-gravity point. However, for example, the drive torques of the imaginary wheels 62_x and 62_y or the translational forces obtained by dividing the driving torques by the radii Rw_x and Rw_y of the imaginary wheels 62_x and 62_y (i.e., the frictional forces between the imaginary wheels 62_x, 62_y and a floor surface) may be used as the manipulated variables.

Returning to the description of FIG. 8, the control unit 50 then supplies the imaginary wheel rotational velocity commands ωw_x_cmd and ωw_y_cmd determined as described above by the posture control calculator 80 to the motor command calculator 82, and carries out the processing by the motor command calculator 82 so as to determine a velocity command ω_R_cmd of the electric motor 31R and a velocity command ω_L_cmd of the electric motor 31L. The processing by the motor command calculator 82 is the same as the processing by the XY-RL converter 86b of the aforesaid limiting processor 86 (refer to FIG. 10).

To be more specific, the motor command calculator 82 determines the velocity commands ω_R_cmd and ω_L_cmd of the electric motors 31R and 31L by a simultaneous equation obtained by replacing ωw_x, ωw_y, ω_R and ω_L of the aforesaid expressions 01a and 01b by ωw_x_cmd, ωw_y_cmd, ω_R_cmd and ω_L_cmd, respectively, taking the ω_R_cmd and ω_L_cmd as unknowns.

Thus, the vehicle control arithmetic processing in the aforesaid STEP9 is completed.

(Operation of the Vehicle)

By the control arithmetic processing carried out by the control unit 50 as described above, the imaginary wheel rotational angular acceleration commands ωwdot_xy_cmd denoting the manipulated variables (control inputs) are determined such that, basically, in the case where the posture of the seat 3 and the base body 9 is maintained at a posture in which the aforesaid base body tilt angle error measured values θbe_x_s and θbe_y_s are both zero (hereinafter, this posture will be referred to as the basic posture) even in a motion mode which is either the boarding mode or the autonomous mode, the vehicle system center-of-gravity point becomes static. Thereafter, when the posture of the seat 3 and the base body 9 is tilted with respect to the basic posture, that is, when the horizontal direction position of the vehicle system center-of-gravity point (the vehicle-occupant overall center-of-gravity point or the vehicle-alone center-of-gravity point) is displaced from the state in which the same is positioned substantially above the ground contact surface of the wheel assembly 5, the imaginary wheel rotational angular acceleration commands ωwdot_xy_cmd are determined so as to restore the posture of the seat 3 and the base body 9 to the basic posture (so as to bring θbe_x_s and θbe_y_s close to "0", or to maintain the same at "0").

Then, the rotational angular velocities of the electric motors 31R and 31L, respectively, obtained by converting the imaginary wheel rotational angular velocity commands ωw_xy_cmd, which is obtained by integrating each component of ωwdot_xy_cmd, are determined as the velocity commands ω_R_cmd and ω_L_cmd of the electric motors 31R and 31L. Further, the rotational velocities of the electric motors 31R and 31L are controlled according to the velocity commands ω_R_cmd and ω_L_cmd. Thus, the moving velocities of the wheel assembly 5 in the X-axis direction and the Y-axis direction, respectively, are controlled so as to agree with the moving velocity of the imaginary wheel 62_x corresponding to ωw_x_cmd and the moving velocity of the imaginary wheel 62_y corresponding to ωw_y_cmd, respectively.

With this arrangement, if, for example, the actual base body tilt angle θb_x deviates from the desired value θb_x_obj in the direction about the Y-axis by leaning forward, then the wheel assembly 5 moves forward to eliminate the deviation (to converge θbe_x_s to zero). Similarly, if the actual base body tilt angle θb_x deviates from the desired value θb_x_obj by leaning backward, then the wheel assembly 5 moves backward to eliminate the deviation (to converge θbe_x_s to zero).

Further, for example, if the actual base body tilt angle θb_y deviates from the desired value θb_y_obj in the direction about the X-axis by leaning rightward, then the wheel assembly 5 moves rightward to eliminate the deviation (to converge θbe_y_s to zero). Similarly, if the actual base body tilt angle θb_y deviates from the desired value θb_y_obj by leaning leftward, then the wheel assembly 5 moves leftward to eliminate the deviation (to converge θbe_y_s to zero).

Further, if both the actual base body tilt angles θb_x and θb_y deviate from the desired values θb_x_obj and θb_y_obj, respectively, then the moving operation of the wheel assembly 5 in the fore-and-aft direction to eliminate the deviation of θb_x and the moving operation of the wheel assembly 5 in the lateral direction to eliminate the deviation of θb_y are combined, so that the wheel assembly 5 will move in a direction combining the X-axis direction and the Y-axis direction (a direction at an angle to both the X-axis direction and the Y-axis direction).

Thus, if the posture of the seat 3 and the base body 9 tilts from the basic posture, then the wheel assembly 5 moves toward the tilting side. Hence, if, for example, the occupant intentionally inclines his/her upper body together with the seat 3 and the base body 9 in the aforesaid boarding mode, then the wheel assembly 5 will move to the tilting side. In the present embodiment, in the case where the seat 3 and the base body 9 are tilted from the basic posture, the traveling direction of the vehicle system center-of-gravity point within the horizontal surface (traveling direction in the direction orthogonal to the Z-axis) and the traveling direction of the wheel assembly 5 does not necessarily coincide, from the reasons to be given later.

When the posture of the seat 3 and the base body 9 is held in a constant posture tilted from the basic posture (a posture in which the base body tilt angle error measured value θbe_xy_s becomes constant), during traveling of the wheel assembly 5 (during traveling of the overall vehicle 1), the moving velocity of the vehicle system center-of-gravity point (and consequently the moving velocity of the wheel assembly 5) converges to a moving velocity having a constant error with the desired center-of-gravity velocities for control Vb_xy_mdfd and also the error thereof depending on the base body tilt angle error measured value θbe_xy_s.

In the present embodiment, in the normal case where the traveling motion of the wheel assembly 5 is carried out in a moving velocity in which the rotational angular velocity of the electric motors 31R and 31L does not become too fast (to be more precise, in the case where the output values Vw_x_lim2 and Vw_y_lim2 are not forcibly restricted by the limit processor 100 of the center-of-gravity velocity restrictor 76), the desired center-of-gravity velocities for control Vb_x_mdfd and Vb_y_mdfd are both maintained at "0". Thereafter, when the posture of the seat 3 and the base body 9 are held in a constant position tilted from the basic position, in the situation where Vb_x_mdfd and Vb_y_mdfd are maintained constant, the moving velocity of the vehicle system center-of-gravity point (and consequently the moving velocity of the wheel assembly 5) converges to the moving velocity having the magnitude and orientation depending on the base body tilt angle error measured value θbe_xy_s.

To give more detailed explanation on the operation mentioned above, in a stationary state in which both of the base body tilt angle error measured values θbe_x_s and θbe_y_s are held constant, the second manipulated variable components u2_x and u2_y becomes "0". Therefore, the imaginary wheel rotational angular acceleration command ωwdot_x_cmd becomes a value in which the first manipulated variable component u1_x is added with the third manipulated variable component u3_x, and the imaginary wheel rotational angular acceleration command ωwdot_y_cmd becomes a value in which the first manipulated variable component u1_y is added with the third manipulated variable component u3_y.

Further, in the stationary state mentioned above, the imaginary wheel rotational angular acceleration commands ωwdot_x_cmd and ωwdot_y_cmd converge to values in which the moving velocity of the wheel assembly 5 may be kept constant. Consequently, the center-of-gravity velocities Vb_x and Vb_y converge to constant values.

In this case, the second term in the right side of the equation 07x (=u2_x) becomes "0", the first term on the right side (=u1_x=K1_x*θbe_x_s) becomes a constant value, and the ωwdot_x_cmd on the left side becomes a constant value, so that a converging value of the center-of-gravity velocity Vb_x in the X-axis direction (a converging value of the estimated center-of-gravity velocity value Vb_x_s, hereinafter referred to as a stationary-state converging velocity Vb_x_stb) depends on the base body tilt angle error measured value θbe_x_s about the Y-axis direction. More specifically, Vb_x_stb becomes Vb_x_stb=(−K1_x*Δθbe_x_s+ωwdot_x_cmd)/K3_x+Vb_x_mdfd, so that it becomes a function value which monotonously change with respect to θbe_x_s.

Similarly, the second term in the right side of the equation 07y (=u2_y) becomes "0", the first term on the right side (=u1_y=K1_y*θbe_y_s) becomes a constant value, and ωwdot_y_cmd in the left side becomes a constant value, so that a converging value of the center-of-gravity velocity Vb_y in the Y-axis direction (a converging value of the estimated center-of-gravity velocity value Vb_y_s, hereinafter referred to as the stationary-state converging velocity Vb_y_stb) depends on the base body tilt angle error measured value θbe_y_s about the X-axis direction. More specifically, Vb_x_stb becomes Vb_y_stb=(−K1_y*Δθbe_y_s+ωwdot_y_cmd)/K3_y+Vb_y_mdfd, so that it becomes a function value which monotonously change with respect to θbe_y_s.

As seen from above, when the posture of the seat 3 and the base body 9 are kept in a constant posture tilted from the base body in the situation where the Vb_x_mdfd and Vb_y_mdfd are kept constant, the moving velocity of the vehicle system center-of-gravity point (and consequently the moving velocity of the wheel assembly 5) converges to a moving velocity with magnitude and orientation depending on the base body tilt angle error measured value θbe_xy_s.

Further, for example, in the situation where the tilt amount of the base body 9 and the seat 3 from the basic posture (the base body tilt angle error measured values θbe_x_s and θbe_y_s) becomes relatively large, and the moving velocities of the wheel assembly 5 in one or both of the X-axis direction and the Y-axis direction in the case where the tilt amount is maintained stable (these moving velocities correspond to the predicted center-of-gravity velocity stead-state error values Vb_x_prd and Vb_y_prd, respectively, shown in FIG. 11) becomes excessive moving velocity so as to make one or both of the rotational angular velocities of the electric motors 31R and 31L deviate from the allowable range at the limiting processor 100, then the velocities in the direction opposite to the moving velocity of the wheel assembly 5 (more specifically, Vw_x_lim2−Vb_x_prd and Vw_y_lim2−Vb_y_prd) are determined as the desired center-of-gravity velocities for control Vb_x_mdfd and Vb_y_mdfd. Thereafter, of the manipulated variable components constituting the control input, the third manipulated variable components u3_x and u3_y are determined so as to converge the estimated center-of-gravity velocity values Vb_x_s and Vb_y_s to the desired center-of-gravity velocities for control Vb_x_mdfd and Vb_y_mdfd, respectively. By doing so, velocity increasing of the wheel assembly 5 is suppressed, and consequently one or both of the rotational angular velocities of the electric motors 31R and 31L are prevented from being too fast.

Further, in the situation where one or both of the estimated center-of-gravity velocity values Vb_x_s and Vb_y_s become large, and consequently one or both of the moving velocities of the wheel assembly 5 in the X-axis direction and the Y-axis direction become excessive moving velocity so as to make one or both of the rotational angular velocities of the electric motors 31R and 31L deviate from the allowable range at the limiting processor 86, then in the gain adjustor 78, one or both of the gain adjustment parameters Kr_x and Kr_y are brought close from 0 to 1, as the deviation becomes more apparent (more specifically, as the absolute values of the Vover_x and Vover_y shown in FIG. 9 become larger).

In this case, each i-th gain coefficient Ki_x (i=1, 2, 3) calculated by the equation 09x approaches from the constant number Ki_a_x on the minimum side to the constant number Ki_b_x on the maximum side, as Kr_x approaches to 1. This applies to each i-th gain coefficient Ki_y (i=1, 2, 3) calculated by the equation 09y.

Thereafter, by increasing the absolute value of the above-mentioned gain coefficient, the sensitivity towards the manipulated amount (the imaginary wheel rotational angular acceleration commands ωwdot_x_cmd and ωwdot_y_cmd) with respect to the change in the tilt of the base body 9 and the seat 3 (the change in the base body tilt angle error measured value θbe_xy_s), and the change in the estimated center-of-gravity velocity values Vb_xy_s increase. Therefore, when the tilt amount of the base body 9 and the seat 3 from the basic posture tends to increase, or the magnitude of the estimated center-of-gravity velocity values Vb_xy_s tend to increase, the moving velocity of the wheel assembly 5 is controlled so as to promptly dissolve the same. Therefore, it becomes possible to strongly restrict the base body 9 from tilting greatly from the basic position or the estimated center-of-gravity velocity values Vb_xy_s from increasing, and consequently, it becomes possible to restrict one or both of the moving velocity of the wheel assembly 5 in the X-axis direction and the Y-axis direction becomes excessive velocity so as to make one or both of the rotational angular velocities of the electric motors 31R and 31L from deviating from the allowable range at the limiting processor 86.

(Control Method of the Functional Unit)

A control method of the operating mode of the electric motors 31R, 31L by the control unit 50 will be explained with reference to FIG. 13.

Figure 13:
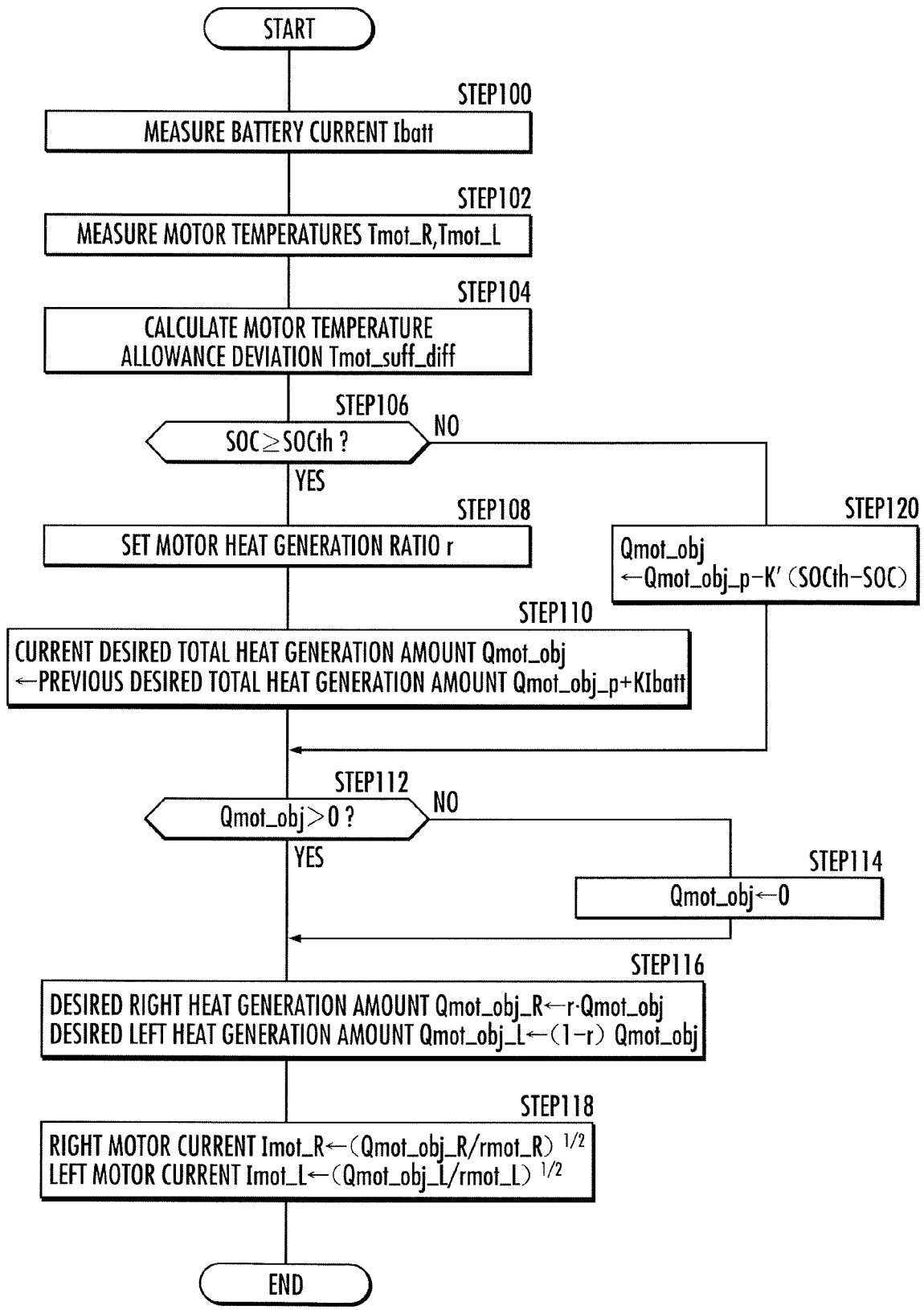
FIG. 13 is an explanatory view in relation to an operation control method of an electric motor.

On the basis of output signals from an ammeter (not shown) provided to an electric wire connected to a terminal of a battery (for example an anode terminal), the control unit 50 calculates a measured value of a battery current Ibatt (FIG. 13/STEP 102). The battery current Ibatt is defined to a "positive" value at the time of charging the battery.

On the basis of output signals from a temperature sensor (not shown) arranged to come into contact with or be in the vicinity of the electric motors 31R, 31L, respectively, the control unit 50 calculates measured values of the temperatures Tmot_R, Tmot_L of the electric motors 31R, 31L, respectively (FIG. 13/STEP 102).

In addition, the measured values of the temperatures Tmot_R, Tmot_L of the electric motors 31R, 31L may be calculated by inputting temperature climb rates Tmotdot_R, Tmotdot_L of the electric motors 31R, 31L to an integral component.

The temperature climb rates Tmotdot_R, Tmotdot_L of the electric motors 31R, 31L are calculated on the basis of heat generation amounts Qmot_R, Qmot_L and heat discharge amounts Qmot_out_R, Qmot_out_L of the electric motors 31R, 31L, and heat capacities Cmot_R, Cmot_L of the electric motors 31R, 31L, and according to equations 11a, 11b.

$$Tmotdot\_R = (Qmot\_R - Qmot\_out\_R)/Cmot\_R \quad \text{equation 11a}$$

$$Tmotdot\_L = (Qmot\_L - Qmot\_out\_L)/Cmot\_L \quad \text{equation 11b}$$

The heat generation amounts Qmot_R, Qmot_L of the electric motors 31R, 31L are calculated on the basis of motor currents Imot_R, Imot_L flowing in the electric motors 31R, 31L, and according to equations 12a, 12b. The motor currents Imot_R, Imot_L mean a square root of a sum of a square of a field current and a square of a torque current. References rR, rL represent an internal resistance of the electric motors 31R, 31L.

$$Qmot\_R = rR(Imot\_R)^2 \quad \text{equation 12a}$$

$$Qmot\_L = rL(Imot\_L)^2 \quad \text{equation 12b}$$

The motor currents Imot_R, Imot_L of the electric motors 31R, 31L are calculated by the control unit 50 on the basis of output signals from a current sensor (not shown) for measuring the current supplied to the electric motors 31R, 31L.

The heat discharge amounts Qmot_out_R, Qmot_out_L of the electric motors 31R, 31L are calculated on the basis of the temperatures Tmot_R, Tmot_L of the electric motors 31R, 31L and an outside temperature Tat, and a heat transfer coefficient κ between the electric motors 31R, 31L and its outside, and according to equations 13a, 13b.

$$Qmot\_out\_R = \kappa(Tmot\_R - Tat) \quad \text{equation 13a}$$

$$Qmot\_out\_L = \kappa(Tmot\_L - Tat) \quad \text{equation 13b}$$

On the measured values of the temperatures Tmot_R, Tmot_L of the electric motors 31R, 31L and temperature threshold values Tmot_th_R, Tmot_th_L of the electric motors 31R, 31L stored in a memory, a difference between temperature allowances Tmot_suff_R, Tmot_suff_L of the electric motors 31R, 31L is calculated as a motor temperature allowance deviation Tmot_suff_diff (FIG. 13/STEP 104).

The temperature allowances Tmot_suff_R, Tmot_suff_L of the electric motors 31R, 31L are represented as differences Tmot_th_R−Tmot_R, Tmot_th_L−Tmot_L, in the state where the temperatures Tmot_R, Tmot_L are equal to or less than the temperature threshold values Tmot_th_R, Tmot_th_L. The temperature threshold values Tmot_th_R, Tmot_th_L are set from the viewpoint that there is a possibility of significantly shortening a heat deterioration lifetime of the electric motors 31R, 31L, in the case where the temperatures Tmot_R, Tmot_L of the electric motors 31R, 31L exceed the temperature threshold values Tmot_th_R, Tmot_th_L. The motor temperature allowance deviation Tmot_suff_diff is represented by an equation 14.

$$Tmot\_suff\_diff = Tmot\_suff\_L - Tmot\_suff\_R = (Tmot\_th\_L - Tmot\_L) - (Tmot\_th\_R - Tmot\_R) \quad \text{equation 14}$$

In the case where the specification and configuration of the electric motors 31R, 31L are equal, and the temperature threshold values Tmot_th_R and T mot_th_L are equal, the temperature difference Tmot_R−Tmot_L of the electric motors 31R, 31L is calculated as the motor temperature allowance deviation Tmot_suff_diff, as is apparent from the equation 14.

In addition, a sum of the difference between the temperature allowances Tmot_suff_R, Tmot_suff_L of the electric motors 31R, 31L (Tmot_suff_dot_L−Tmot_suff_dot_R) and a proportional value α of the temporal change rate of the difference (α is a positive coefficient) may be calculated as the motor temperature allowance deviation Tmot_suff_diff.

It is determined whether or not a state of charge (charge state quantity) SOC of the battery is equal to or more than a charge threshold value SOCth (FIG. 13/STEP 106). The state of charge SOC of the battery may be calculated as a time integral value of a result of inputting the battery current Ibatt to a calculator taking an integral component as a transfer function. The charge threshold value SOCth is set from the viewpoint that the possibility of promoting degradation of the battery performance becomes higher in the case where the state of charge SOC of the battery greatly exceeds the charge threshold value SOCth, and is stored in a memory.

In the case where it is determined that the state of charge SOC of the battery is equal to or more than the charge threshold value SOCth (FIG. 13/STEP 106 . . . YES), the control unit 50 sets a motor heat generation ratio r (FIG. 13/STEP 108).

Figure 14:
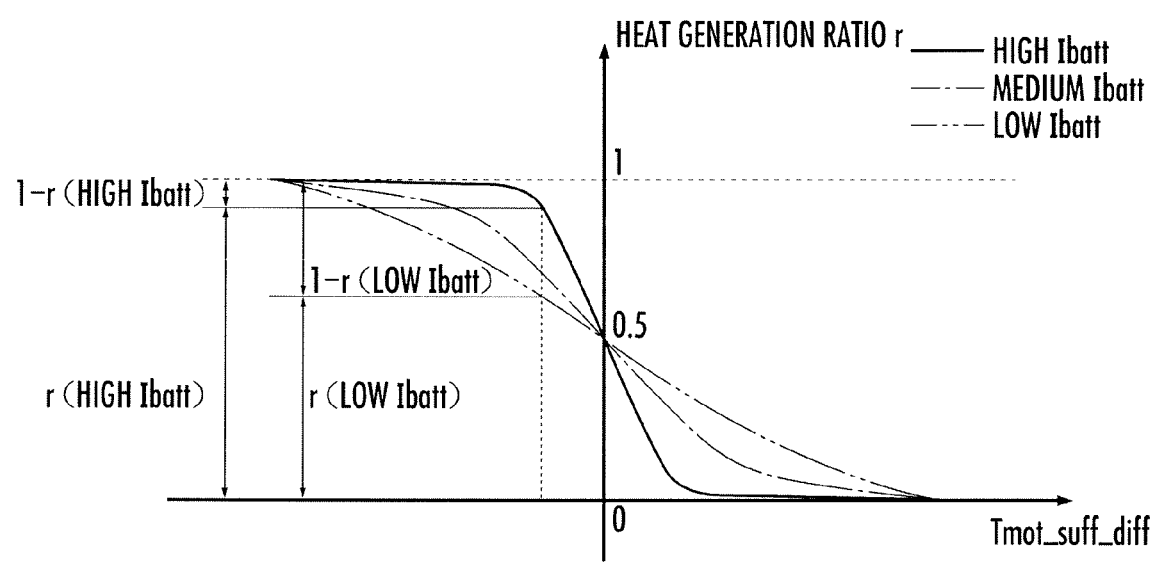
FIG. 14 is an explanatory view in relation to a control method of a heat generation ratio of the electric motor.

More specifically, a ratio of the heat generation amount Qmot_R of the electric motor 31R to a total heat generation amount Qmot of the electric motors 31R, 31L is set as the motor heat generation ratio r. For example, the motor heat generation ratio r is set according to a heat generation ratio function as a dependent variable taking the temperature allowance deviation Tmot_suff_diff as a main variable, which is represented by a curve, for example, as is shown in FIG. 14.

The heat generation ratio function is set to a value of "0.5", in the case where the temperature allowance deviation Tmot_suff_diff is zero, i.e., in the case where the temperature allowance Tmot_suff_R of the right electric motor 31R is equal to the temperature allowance Tmot_suff_L of the left electric motor 31L. In the case where the heat capacity Cmot_R of the right electric motor 31R is different from the heat capacity Cmot_L of the left electric motor 31L, then this value becomes "Cmot_R/(Cmot_R+Cmot_L)", and not 0.5.

Further, the heat generation ratio function has a characteristics of approaching "1" continuously or discontinuously as the absolute value of the temperature allowance deviation Tmot_suff_diff becomes larger, in the case where the temperature allowance deviation Tmot_suff_diff is negative, i.e., in the case where the temperature allowance Tmot_suff_R of the right electric motor 31R is larger than the temperature allowance Tmot_suff_L of the left electric motor 31L.

Still further, the heat generation ratio function has a characteristics of approaching "0" continuously or discontinuously as the absolute value of the temperature allowance deviation Tmot_suff_diff becomes larger, in the case where the temperature allowance deviation Tmot_suff_diff is positive, i.e., in the case where the temperature allowance Tmot_suff_L of the left electric motor 31L is larger than the temperature allowance Tmot_suff_R of the right electric motor 31R.

In the case where the temperature allowance deviation Tmot_suff_diff is negative, the heat generation ratio function shows a characteristics of approaching rapidly to "1" or taking a large value, as the battery current Ibatt is lower. In the case where the temperature allowance deviation Tmot_suff_diff is positive, the heat generation ratio function shows a characteristics of approaching rapidly to "0" or taking a small value, as the battery current Ibatt is lower. In addition, the changing mode of the heat generation ratio function may be constant regardless of the battery current Ibatt.

A current desired total heat generation amount Qmot_obj of the electric motors 31R, 31L is set as a sum of a previous desired total heat generation amount Qmot_obj_p and a proportional value K·Ibatt of the battery current Ibatt (K>0) (FIG. 13/STEP 110).

On the other hand, in the case where it is determined that the state of charge SOC of the battery is less than the charge threshold value SOCth (FIG. 13/STEP 106 . . . NO), the current desired total heat generation amount Qmot_obj of the electric motors 31R, 31L is set as a sum of the previous desired total heat generation amount Qmot_obj_p and a proportional value K'(SOCth−SOC) of a difference of the charge threshold value SOCth and the state of charge SOC (K'>0) (FIG. 13/STEP 120).

On the basis of the above, it is determined whether or not the desired total heat generation amount Qmot_obj is positive (FIG. 13/STEP 112).

In the case where it is determined that the desired total heat generation amount Qmot_obj is positive (FIG. 13/STEP 112 . . . YES), a desired heat generation amount Qmot_obj_R of the right electric motor 31R (a desired right heat generation amount) and a desired heat generation amount Qmot_obj_L of the left electric motor 31L (a desired left heat generation amount) are set (FIG. 13/STEP 116). The desired right heat generation amount Qmot_obj_R is set by multiplying the heat generation ratio r to the desired total heat generation amount Qmot. The desired left heat generation amount Qmot_obj_L is set by multiplying a difference between 1 and the heat generation ratio r (1−r) to the desired total heat generation amount Qmot.

In addition, in the case where it is determined that the state of charge SOC of the battery is less than the charge threshold value SOCth (FIG. 13/STEP 106 . . . NO), both of the desired right heat generation amount Qmot_obj_R and the desired left heat generation amount Qmot_obj_L may be set to zero.

In the case where it is determined that the desired total heat generation amount Qmot_obj is zero or negative (FIG. 13/STEP 112 . . . NO), the desired total heat generation amount Qmot_obj is reset to zero (FIG. 13/STEP 114), and the desired right heat generation amount Qmot_obj_R and the desired left heat generation amount Qmot_obj_L are set as is explained above (FIG. 13/STEP 116). That is, in this case, the desired right heat generation amount Qmot_obj_R and the desired left heat generation amount Qmot_obj_L are both set to zero.

The control unit 50 sets the motor currents Imot_R, Imot_L of the electric motors 31R, 31L, on the basis of the desired right heat generation amount Qmot_obj_R and the desired left heat generation amount Qmot_obj_L, respectively, and the internal resistance rmot_R, rmot_L of the electric motors 31R, 31L (FIG. 13/STEP 118). In setting of the values, for example, relational expressions 15a, 15b are used.

$$Imot\_R = (Qmot\_obj\_R/rmot\_R)^{1/2} \quad \text{expression 15a}$$

$$Imot\_L = (Qmot\_obj\_L/rmot\_L)^{1/2} \quad \text{expression 15b}$$

Thereafter, the control unit 50 controls the motor currents Imot_R, Imot_L of the electric motors 31R, 31L to conform to the set value.

(Functional Effect of the Vehicle of the Present Invention)

According to the vehicle 1 as the mobile device of the present invention, in the case where the temperature allowance of one of a plurality of the translational mechanism (the electric motors 31R, 31L) is larger than the temperature allowance of the other translational mechanisms, the operating mode of a plurality of the translational mechanisms are controlled so that the heat generation amount of the one translational mechanism becomes larger than the heat generation amount of the other translational mechanism.

To be more specific, a ratio of the heat generation amount of each translational mechanism (the desired right heat generation amount Qmot_obj_R and the desired left heat generation amount Qmot_obj_L) to the total heat generation amount of a plurality of the translational mechanisms (the desired total heat generation amount Qmot_obj) ("r" and "1−r") is adjusted according to the difference of the temperature allowance Tmot_suff_diff among each translational mechanism.

For example, in the case where the temperature allowance Tmot_suff_R of the right electric motor 31R is larger than the temperature allowance Tmot_suff_L of the left electric motor 31L, that is, in the case where the motor temperature allowance deviation Tmot_suff_diff is "negative", the heat generation ratio is set to a value larger than 0.5 (refer to FIG. 14). By doing so, the desired right heat generation amount Qmot_obj_R is set to a value larger than the desired left heat generation amount Qmot_obj_L (refer to FIG. 13/STEP 116).

On the other hand, in the case where the temperature allowance Tmot_suff_L of the left electric motor 31L is larger than the temperature allowance Tmot_suff_R of the right electric motor 31R, that is, in the case where the motor temperature allowance deviation Tmot_suff_diff is "positive", the heat generation ratio r is set to a value smaller than 0.5 (refer to FIG. 14). By doing so, the desired left heat generation amount Qmot_obj_L is set to a value larger than the desired right heat generation amount Qmot_obj_R (refer to FIG. 13/STEP 116).

Thereafter, the motor current of each motor is controlled so that the motor current and further the field current of the one motor having relatively large temperature allowance becomes larger than the motor current and further the field current of the other motor having relatively small temperature allowance (refer to FIG. 13/STEP 118). As a result, it becomes possible to avoid the situation where the battery current Ibatt becomes positive in the state where there is a possibility of the battery being overcharged. Further, the difference of the temperature allowance Tmot_suff_diff between the electric motors 31R, 31L as a plurality of the translational mechanisms is reduced, and the situation where the temperature of a specific translational mechanism being remarkably higher than the other translational mechanisms is avoided.

Further, as the battery current Ibatt is larger, that is, as a consumption allowance of the electric energy accumulated in an energy accumulation component (battery) (state of charge SOC) is larger, the difference between the ratio of the heat generation amount of each translational mechanism (the desired right heat generation amount Qmot_obj_R and the desired left heat generation amount Qmot_obj_L) with respect to the total heat generation amount by a plurality of the translational mechanisms (the desired total heat generation amount Qmot_obj) ("r" and "1−r") is set to be smaller (refer to FIG. 14). Therefore, as the state of charge SOC of the battery is larger, the difference of the heat generation amounts Qmot_R, Qmot_L between the electric motors 31R, 31L is reduced. By doing so, it becomes possible to avoid the situation where the energy consumption volume and further the heat generation amount of a part of the translational mechanisms among a plurality of the translational mechanisms become excessive compared to the other translational mechanisms.

As a result, frequency of the temperatures Tmot_R, Tmot_L of each electric motors 31R, 31L elevating to a temperature high enough to promote shortening of the heat deterioration lifetime is decreased. As a result, it becomes possible to extend the heat deterioration lifetime of each of the electric motors 31R, 31L.

Because the electric motors 31R, 31L as a plurality of the translational mechanisms are configured from the same specification, and the operating mode of each of the electric motors 31R, 31L and the relationship of the heat generation amounts Qmot_R, Qmot_L are common, it becomes possible to easily adjust the heat generation amounts Qmot_R, Qmot_L of the electric motors 31R, 31L according to differentiation of the operating mode of each of the electric motors 31R, 31L and the like.

Further, the common traveling motion unit 5 is driven by a plurality of the translational mechanisms (the electric motors 31R, 31L), but the extension of the heat deterioration lifetime of each of a plurality of the translational mechanisms may be obtained as is explained above. Therefore, it becomes possible to decrease the frequency of disablement of the traveling motion unit 5 from disablement of a part of a plurality of the translational mechanisms, and further the disablement of the vehicle 1 as the mobile device.

(Other Embodiments of the Present Invention)

Next, explanation will be given on other embodiments of the mobile device of the present invention explained above.

As another embodiment of the mobile device of the present invention which differs from the vehicle 1 of a configuration as shown in FIG. 1 and FIG. 2, any mobile device configured to be in translational motion by an actuation of a translational mechanism or a plurality of actuators as a constituent component thereof may be adopted.

To be more specific, the wheel assembly 5 serving as the traveling motion unit of the vehicle 1 in the above-explained embodiments has the one-piece construction. Alternatively, however, the wheel assembly 5 may have a construction shown in, for example, FIG. 9 of the aforesaid patent document 3. More specifically, the wheel assembly may be constructed to have a rigid annular shaft member and a plurality of rollers rotatively and externally inserted into the rigid annular shaft member such that the axial centers thereof are oriented in the tangential direction of the shaft member, the plurality of these rollers being arranged in the circumferential direction along the shaft member.

Further, the traveling motion unit may have a crawler-shaped structure, as shown in, for example, FIG. 3 of patent document 2.

Figure 4:
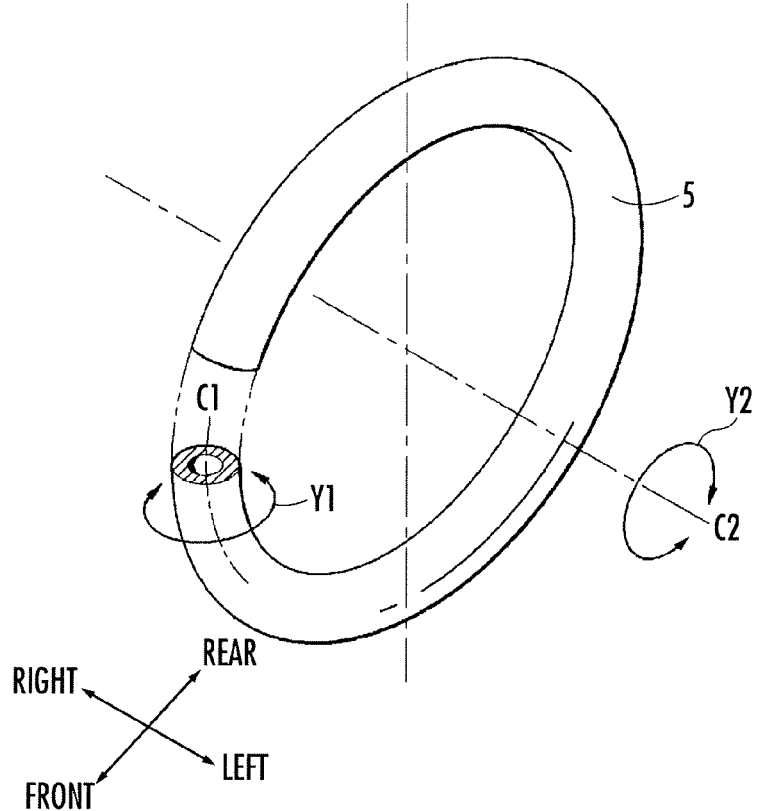
FIG. 4 is a perspective view of a traveling motion unit (wheel assembly) of the inverted pendulum type vehicle.

Alternatively, as shown in, for example, FIG. 4 of the aforesaid patent document 2, FIG. 6 of patent document 3, or FIG. 1 of patent document 1, the traveling motion unit may be constructed of a spherical member, and the vehicle may be constructed such that the spherical member is rotatively driven in a direction about the X-axis and a direction about the Y-axis by an actuator (e.g., an actuator having the aforesaid wheel assembly 5).

Further, in the above-explained embodiments, the vehicle 1 provided with the seat 3 as the boarding section for an occupant has been exemplified. Alternatively, however, the inverted pendulum type vehicle in accordance with the present invention may be a vehicle having a construction wherein a step on which an occupant rests his/her both feet and a section to be gripped by the occupant standing on the step are mounted on a base body, as illustrated in, for example, FIG. 7 in patent document 3.

Thus, the present invention can be applied to inverted pendulum type vehicles of various constructions, as illustrated in the aforesaid patent documents 1 to 3 and the like.

Further, the inverted pendulum type vehicle in accordance with the present invention may be provided with a plurality of traveling motion units (e.g., two in the lateral direction, or two in the fore-and-aft direction, or three or more) capable of traveling in all directions on a floor surface.

Further, the inverted pendulum type vehicle in accordance with the present invention may be an inverted pendulum type vehicle of a form with an object payload supporting part being tillable about one-axis (for example, about an axis in a lateral direction of an occupant boarding the vehicle), and traveling the vehicle in the fore-and-aft direction of the occupant in accordance with the tilting thereof.

Further, the inverted pendulum type vehicle of the above-mentioned embodiment is a vehicle equipped with a payload supporting part (seat) 3 for the occupant as an object loading unit, however, it may be equipped with a loading unit for loading a target object for transportation such as a package, in place of the payload supporting part 3 for an occupant. In this case, the control process similar to the boarding mode may be executed in the state where the target object for transportation is loaded on the loading unit, and the control process similar to the autonomous mode may be executed in the state where the target object for transportation is not loaded.

In the above-mentioned embodiment, two electric motors 31R, 31L (translational mechanisms) are provided to the vehicle 1 for activating the common traveling motion unit 5, however, three or more translational mechanisms for activating the common traveling motion unit may be provided to the vehicle (refer to Patent Document 1).

In the above-mentioned embodiment, specification of the electric motors 31R, 31L (translational mechanisms) are identical. However, as another embodiment, at least a part of the specification of a plurality of the translational mechanisms may differ from each other. In this case, the heat capacity Cmot_R of the right electric motor 31R and the heat capacity Cmot_L of the left electric motor 31L normally differ. Taking this point into consideration, the heat generation ratio function may be defined so that the value becomes Cmot_R/(Cmot_R+Cmot_L) and not 0.5, in the case where the temperature allowance deviation Tmot_suff_diff is zero, that is, in the case where the temperature allowance Tmot_suff_R of the right electric motor 31R and the temperature allowance Tmot_suff_L of the left electric motor 31L are equal (refer to FIG. 14).

It may be set so that the control unit 50 controls the operating mode of at least one translational mechanism so as to decrease the heat generation amount of the at least one translational mechanism, and as well as actuates a braking mechanism (the mechanical brakes 34R, 34L), taking the existence of a temperature allowance or a heat accumulation allowance as a requirement.

A second temperature threshold value that becomes a calculation standard of the temperature allowance of the braking mechanism normally differs from the temperature threshold values Tmot_th_R, Tmot_th_L that are the calculation standard of the temperature allowance of the translational mechanisms (the electric motors 31R, 31L). Further, a second heat accumulation threshold value that becomes a calculation standard of the heat accumulation allowance of the braking mechanism normally differs from heat accumulation threshold values Qmot_res_th_R, Qmot_res_th_L that are the calculation standard of the heat accumulation allowance of the translational mechanisms (the electric motors 31R, 31L).

According to the mobile device of the above-mentioned configuration, change in the translational mode of the mobile device (vehicle 1) in accordance with the change in the operating mode of a plurality of the translational mechanisms so as to decrease the heat generation amount of at least one translational mechanism may be adjusted by the operation of the braking mechanism having temperature allowance or heat accumulation allowance. That is, the translational mode of the mobile device may be controlled so that the decrease in the temperature allowance or the heat accumulation allowance of at least one translational mechanism is substituted by the decrease in the temperature allowance or the heat accumulation allowance of the braking mechanism. For example, the motor currents Imot_R, Imot_L are controlled so that a rotating torques of the rotating members 27R, 27L by the electric motors 31R, 31L are increased as much as the increase in braking torques of the rotating members 27R, 27L by the mechanical brakes 34R, 34L.

By doing so, the difference in the temperature allowance or the heat accumulation allowance between a plurality of the translational mechanisms is reduced, so that a decrease in the frequency of the temperature of each of a plurality of the translational mechanisms from elevating to a temperature high enough to promote shortening of the heat deterioration lifetime may be obtained. As a result, it becomes possible to extend the heat deterioration lifetime of each of the translational mechanisms.

The invention claimed is:

1. A mobile device equipped with an energy accumulation component, a plurality of translational mechanisms for translational movement of the mobile device which actuate by consuming energy accumulated in the energy accumulation component, a first temperature measurement component configured to measure or estimate temperature of each translational mechanism, and a control device configured to control operation of each translational mechanism,
further comprising an energy remaining amount measurement component configured to measure or estimate an energy remaining amount of the energy accumulation component,
wherein the control device is configured to control operating mode of each translational mechanism, in accordance with a temperature allowance of each translational mechanism which is a difference between a temperature of each translational mechanism measured or estimated by the first temperature measurement component in the state being smaller than a first temperature threshold value and the first temperature threshold value, or a sum of the difference and a proportional values of a temporal change rate of the difference, so that a heat generation amount of one translational mechanism having large temperature allowance compared to other translational mechanisms becomes larger compared to the heat generation amounts of other translational mechanisms,
wherein the control device is further configured to control the operating mode of each translational mechanism so that a difference between a ratio of the heat generation amount of the one translational mechanism with respect to a total heat generation amount of a plurality of the translational mechanisms and a ratio of the heat generation amounts of the other translational mechanisms with respect to the total heat generation amount of a plurality of the translational mechanisms becomes larger, as a difference between the temperature allowance of the one translational mechanism and the temperature allowance of the other translational mechanisms becomes larger, and
wherein the control device is further configured to control the operating mode of each of a plurality of the translational mechanisms, respectively, so that the difference between the ratio of the heat generation amount of the one translational mechanism with respect to the total heat generation amount of a plurality of the translational mechanisms and the ratio of the heat generation amounts of the other translational mechanisms with respect to the total heat generation amount of a plurality of the translational mechanisms becomes smaller, as the energy remaining amount measured or estimated by the energy remaining amount measurement component becomes larger.

2. The mobile device according to claim 1, wherein a plurality of the translational mechanisms are configured from identical specification.

3. The mobile device according to claim 1, further comprising a traveling motion unit which actuates a translational force of the mobile device with respect to a floor surface, while in contact with the floor surface,
wherein the mobile device is configured so that the common traveling motion unit is driven by a plurality of the translational mechanisms.

4. A mobile device equipped with an energy accumulation component, a plurality of translational mechanisms for translational movement of the mobile device which actuate by consuming energy accumulated in the energy accumulation component, a first temperature measurement component configured to measure or estimate temperature of each translational mechanism, and a control device configured to control operation of each translational mechanism,
further comprising a braking mechanism which actuates to brake a translational motion of the mobile device, and a second temperature measurement component configured to measure or estimate a temperature of each braking mechanism,
wherein the control device is configured to control operating mode of each translational mechanism, in accordance with a temperature allowance of each translational mechanism which is a difference between a temperature of each translational mechanism measured or estimated by the first temperature measurement component in the state being smaller than a first temperature threshold value and the first temperature threshold value, or a sum of the difference and a proportional values of a temporal change rate of the difference, so that a heat generation amount of one translational mechanism having large temperature allowance compared to other translational mechanisms becomes larger compared to the heat generation amounts of other translational mechanisms, and
wherein the control device is further configured to control the operating mode of at least one translational mechanism so that the heat generating amount of the at least one translational mechanism decreases, and as well as to actuate the braking mechanism, taking the existence of a temperature allowance of the braking mechanism which is a difference between a temperature of the braking mechanism measured or estimated by the second temperature measurement component in the state being smaller than a second temperature threshold value and the second temperature threshold value, or a sum of the difference and a proportional value of a temporal change rate of the difference, as a requirement.

5. A mobile device equipped with an energy accumulation component, a plurality of translational mechanisms for translational movement of the mobile device which actuate by consuming energy accumulated in the energy accumulation component, a first temperature measurement component configured to measure or estimate temperature of each translational mechanism, and a control device configured to control operation of each translational mechanism,
wherein the control device is configured to control operating mode of each translational mechanism, in accordance with a temperature allowance of each translational mechanism which is a difference between a temperature of each translational mechanism measured or estimated by the first temperature measurement component in the state being smaller than a first temperature threshold value and the first temperature threshold value, or a sum of the difference and a proportional values of a temporal change rate of the difference, so that a heat generation amount of one translational mechanism having large temperature allowance compared to other translational mechanisms becomes larger compared to the heat generation amounts of other translational mechanisms, and wherein the control device is equipped with a desired total heat generation amount determination component configured to determine a desired total heat generation amount by the operation of a plurality of the translational mechanisms, on the basis of the energy consumption amount of each translational mechanism, a heat generation ratio determination component configured to determine a heat generation ratio of each translational mechanism in accordance with the temperature allowance of each translational mechanism, and a desired heat generation amount determination component configured to determine a desired heat generation amount of each translational mechanism, respectively, by integrating the heat generation ratio and the desired total heat generation amount, wherein the control device is further configured to control the operation of each translational mechanism so that the actual heat generation amount coincides with the desired heat generation amount.

* * * * *